United States Patent [19]

Pruett

[11] Patent Number: 5,893,701
[45] Date of Patent: Apr. 13, 1999

[54] METHOD AND APPARATUS FOR FORMING GROUPS OF WORK PRODUCTS

[75] Inventor: Daniel W. Pruett, Colbert, Ga.

[73] Assignee: Food Machinery Sales, Inc., Athens, Ga.

[21] Appl. No.: 08/662,535

[22] Filed: Jun. 13, 1996

[51] Int. Cl.$^6$ .................... B65G 57/32; B65G 47/29; B65G 47/31

[52] U.S. Cl. .................. 414/798.2; 414/798.7; 198/419.1; 198/419.3

[58] Field of Search .............. 198/419.1, 419.3; 414/798.2, 798.6, 798.7

[56] References Cited

U.S. PATENT DOCUMENTS

| | | | |
|---|---|---|---|
| 3,174,540 | 3/1965 | Copping et al. | 198/419.3 |
| 4,098,392 | 7/1978 | Greene | 414/798.2 |
| 4,235,329 | 11/1980 | Crawford et al. | 198/419 |
| 5,065,856 | 11/1991 | Reid et al. | 198/419.3 |
| 5,095,684 | 3/1992 | Walker et al. | 53/443 |
| 5,190,431 | 3/1993 | Klug et al. | 414/417 |

*Primary Examiner*—William E. Terrell
*Assistant Examiner*—Mark Deuble
*Attorney, Agent, or Firm*—Alston & Bird, LLP

[57] ABSTRACT

A method and apparatus for forming groups of work products from a row of closely spaced, aligned, and a vertical edge standing work products is disclosed. A separator knife (37) is inserted into the row of edge standing work products (25) in timed relationship with the movement of the row of work products on a feed conveyor (9) and along a path of travel (P) at a speed and direction substantially the same as the speed and direction of the work products. The separator knife is stopped at a home position (53) fixed along the path of travel for accumulating at least a portion of the row of work products on the feed conveyor upstream of the home position, as the remainder of the row of work products is moved along the path of travel away from the separator blade thus forming a first group (G) of work products. The apparatus includes a spaced series of knife assemblies (36), each knife assembly having separator knife (37). The knife assemblies are moved in series within a cam track (35) extending along a portion of the path of travel so that the separator knives of the knife assemblies are sequentially inserted into the row of work products and then stopped to accumulate the work products on the feed conveyor to form a gap (g) between the separator knife and the remaining portion of the row of work products, which leads to the formation of a group of work products moving downstream and away from the separator knife.

27 Claims, 11 Drawing Sheets

METHOD AND APPARATUS FOR FORMING GROUPS OF WORK PRODUCTS

FIELD OF THE INVENTION

This invention relates in general to packaging machinery. More particularly, this invention relates to a method and apparatus for forming groups of work products from an aligned edge standing row of work products being moved along a path of travel on a feed conveyor so that separate groups of work products are formed therefrom and downstream along the path of travel.

BACKGROUND OF THE INVENTION

In the production and packaging of baked work products, for example, cookies, crackers, wafers and the like, the dough of the work products is distributed over and deposited on a plurality of parallel conveyors which move the work products for baking through an oven. Once carried through the ovens, the now baked work products may be further processed, for example, so that the work products are enrobed or iced and used to form cookie or cracker sandwiches. The work products are then typically moved in series along at least one, and oftentimes several, parallel conveyor lines for wrapping and packaging.

In known fashion, the work products can be carried in a low shingle, i.e., the leading edge of each work product is rested on the trailing edge of the work product immediately ahead of it as the work products move downstream along the path of travel. The work products can be kept in a low shingle until they arrive at a packaging machine where they are formed into a row of generally aligned and vertically edge standing work products positioned adjacent one another, forming a continuous line along a portion of the path of travel. However, in order to package the work products they must first be formed into separate groups of a consistent and uniform size. These grouped work products can then either be packaged in a thermoplastic packaging film formed as a tube about the work products, or they can be moved into a tray or other package in which the work products are sealed and transported for sale.

Not only will the aligned row of edge standing work products be formed into separate groups, however, but this is typically at production rates which may exceed several hundred work products per minute, for example 350 to 450 work products per minute delivered from the baking oven conveyor lines to the packaging line. Thus, what is needed is a method and apparatus of quickly and efficiently forming separate groups of work products for packaging which will not damage the work products while so doing, and which will be able to match the product flow rates upstream on the production line without otherwise slowing or impeding the production flow of the work products at the group forming and wrapping stage.

An early example of an apparatus used to form groups of work products is disclosed in U.S. Pat. No. 4,235,329 to Crawford, et al., issued Nov. 25, 1980. Crawford, et al. teach a series of adjacent work products being moved along a path of travel on the feed conveyor of a packaging machine in which a portion of the feed conveyor is upwardly displaceable in timed relationship with the movement of the work products along the path of travel so that the downstream work products are separated from the generally continuous row of upstream work products. Thereafter, one of a series of spaced lugs is moved into position for pushing the now separated group of work products along the feed conveyor toward an accumulating device, the end of the feed conveyor adjacent the accumulating device being vertically displaceable in timed relationship with the movement of the work products along the path of travel for placing the groups of work products onto separate levels of the accumulating device. The apparatus of Crawford, et al., however, appears to be best suited for work products which are laying along their longest rectilinear dimension, and does not appear to be well suited for dealing with a series of aligned and vertical edge standing work products being delivered from a high speed production line. Moreover, it does not appear that the device of Crawford, et al. is well suited for automatically adjusting the spacing between groups of work products, as well as setting the dwell, i.e., delay, in which the group of work products is formed for automatically sizing the groups of work products as they are moved along the path of travel.

Another approach to forming separate groups of work products from a row of work products is disclosed in U.S. Pat. No. 4,098,392 to Greene, issued Jul. 4, 1978, and in U.S. Pat. No. 5,095,684 to Walker, et al., issued Mar. 17, 1992. In the patent to Greene a series of juxtaposed separator blades are inserted downwardly into a line of edge standing work products, in this instance potato chips, whereupon the juxtaposed separator blades are moved apart from one another for forming a gap between the work products, thus forming groups of work products for packaging. The device of Greene accomplishes this task by using a guide track which functions as a cam for directing the juxtaposed blades into the row of work products and a second mechanical camming mechanism which acts to move the upstream separator blade away from the downstream separator blade as both blades move with respect to one another along the path of travel.

In the patent to Walker, et al., a series of work products are moved toward a pair of separator blades located near a cookie tray loading station the work products being in an aligned edge standing relationship with one another on a moving surface conveyor. As with the device of Greene, the device of Walker, et al. uses a pair of juxtaposed separator blades which are inserted downwardly into the row of work products, the separator blades then being mechanically cammed apart from one another forming a gap in the row of work products, and thus forming a group of work products downstream of the separator blades for being loaded into in a cookie tray.

Both the patents to Greene and to Walker, et al., however, rely on fixed mechanical relationship for forming the groups of work products as the work products progress along the path of travel. Moreover, and in a fashion similar to the device of Crawford, et al., the devices of Greene and to Walker, et al. are not designed for forming groups of work product, i.e., slugs of work products, which may vary, or may be automatically varied in size during processing. Also, the devices of Greene and Walker, et al. rely solely on mechanical mechanisms to move a pair of juxtaposed separator blades apart for forming a gap in the row of work products to create a group or slug of work products, all of the slugs of work products being of fixed and constant dimension without the ability to automatically vary the size of the slug from group to group of work products in accordance with the packaging needs of the processing operation.

Thus, what is needed, but seemingly unavailable in the art, is a method and apparatus for forming groups or slugs of work products from a generally continuous row of vertical edge standing and aligned work products being moved at a high rate of speed along a packaging line which also allows for the automatic sizing of the groups of work products without the need to stop the production line in order to reset the sizing mechanism forming the groups of work products. What is also needed, but seemingly unavailable in the art, is a method and apparatus of forming groups of work products which can be used with any typed of closely aligned work products, to include not only baked foodstuffs, but also other work products capable of being produced in high volume, high speed, manufacturing operations with the requirement of forming groups of work products for packaging and/or further processing. Therefore, what is needed is a universal method and apparatus for forming groups of work products from a continuous and aligned row of edge standing work products regardless of the type of work products being processed, and adapted to work with high speed packaging production lines.

SUMMARY OF THE INVENTION

The present invention provides an improved method and apparatus for forming groups of work products from a row of aligned and vertically edge standing work products moved along a high speed, high volume packaging line which overcomes some of the design deficiencies of the other group forming apparatuses known in the art.

The improved method of this invention is particularly well suited for use in forming groups of work product from a continuous row of edge standing and aligned work products being moved along a path of travel on a continuous operating feed conveyor, and being supplied in turn to the infeed conveyor of a packaging machine. The infeed conveyor, as known in the art, will have continuously moving and spaced series of flights defined by a spaced series of timing pins extending upwardly through a dead plate and moving along a path of travel toward a packaging machine. In the novel method of this invention a separator knife is inserted into the row of work products in timed relationship with the movement of the row of work products along the path of travel at a speed and direction substantially the same as the speed and direction of the work products along the path of travel. Once inserted, the separator knife is stopped at a home position fixed along the path of travel for accumulating at least a portion of the row of work products on the feed conveyor upstream of the home position. This forms a first group of work products downstream of the home position as the remainder of the row of work products continues to move downstream along the path of travel and away from the separator blade toward one of the flights of the infeed conveyor.

The method of this invention also includes the steps of moving the separator knife and the accumulated work products from the home position in the direction of the path of travel in timed response to the movement of the flights of the infeed conveyor along the path of travel, whereupon the separator knife is withdrawn from in front of the row of work products and the row of work products released for movement along the path of travel toward the infeed conveyor and packaging machine. Thereafter, and in fashion similar to the insertion of the first separator knife, a second separator knife is sequentially inserted into the row of work products in timed relationship with the movement of the row of work products along the path of travel, at a speed and direction substantially the same as the speed and direction of the row of work products on the conveyor. Thereafter, the second separator knife, in fashion similar to the first separator knife, is stopped at the home position for accumulating at least a portion of the row of work products on the feed conveyor upstream of the home position as the remainder of the row of work products travels downstream toward the packaging machine forming a second group of work products spaced from the first group of work products.

In fashion heretofore unknown in the art, this invention includes the step of automatically changing the timed relationship between the movement of the separator knives from the home position with respect to the movement of the flights of the infeed conveyor for varying, i.e., increasing and decreasing, the size of the groups of work products being moved into the flights of the feed conveyor. The timed relationship between the movement of the separator knives and the flights of the infeed conveyor may be automatically changed based on the measurement of the size of the groups of work products moving along the path of travel downstream of the home position to insure that a uniform and consistent group size is obtained. Also, in order to properly position the group of work products within the flights of the infeed conveyor, the method of this invention includes the step of phasing the movement of the separator knife from its home position in the direction of the path of travel with respect to the position of the flights of the infeed conveyor for retarding or advancing the movement of the groups of work products toward the flights of the infeed conveyor.

This invention also includes the steps of activating a plurality of air jets to create an opening within the row of work products simultaneously with the insertion of the separator knife, as well as momentarily slowing or decelerating the feed conveyor belt on which the row of work products is being moved in order to facilitate the insertion of the separator knife into the row of work products while minimizing damage to the work products.

The apparatus practicing the method of this invention includes separate and integral mechanical and electronic cam mechanisms which work in timed relationship with one another to sequentially insert a series of separator knives into the row of work products in timed relationship with the movement of the row of work products along the path of travel and at a speed and direction substantially the same as the speed and direction of the row of work products. The cam mechanism is constructed and arranged to stop the separator knives at a home position fixed along the path of travel, to move the separator knives from their home position in the direction of the path of travel in timed response to the movement of the flights of the infeed conveyor, and to then withdraw the separator knife positioned in front of the row of work products and away therefrom for releasing the row of work products for movement along the path of travel toward the packaging machine.

The apparatus includes a detector for emitting a detection signal in response to the arrival of the separator knives at the home position wherein the mechanical cam is constructed and arranged to stop the separator knife assemblies with an electronic cam profile stored within a central processor, the separator knife dwelling, i.e., holding its position, during a preprogrammed dwell period whereupon the separator knife is then moved by the mechanical cam mechanism in accordance with the instructions of the electronic cam profile to move the row of work products in the direction of the path of travel in timed relationship with flights of the feed conveyor by withdrawing the separator knife from in front of the work products to allow the row of work products to be moved toward and ultimately into one of the flights of the infeed conveyor as a second separator knife is sequentially inserted into the row of work products at a speed and direction substantially the same as the speed and direction of the row of work products upstream along the feed conveyor.

The mechanical cam mechanism of the invention includes a simple and durable assembly having a cam track extending along the path of travel, the cam track having a cam profile for moving the separator knives vertically downward into the row of work products. Each separator knife is formed as a part of a separator knife assembly which includes a cam follower for being guided within the cam track. An endless chain conveyor moves a spaced series of separator knife assemblies along the cam track in accordance with the electronic cam profile so that only one separator knife at a time is inserted into the row of work products, and so that the separator knives may be simultaneously positioned above the row of work products in order to allow the row of work products to pass underneath the separator knives totally unimpeded by the separator knives.

The electronic cam mechanism which controls the mechanical cam mechanism includes a control processor in which a preprogrammed electronic cam profile is stored. The control processor receives servomotor drive position signals from an encoder provided as a part of the servomotor which drives the mechanical cam assembly, as well as receiving signals from the infeed conveyor emitted either by an encoder mechanically driven by the infeed conveyor, if necessary, or from the control processor of the packaging machine to time the movement of the separator knives with the movement of the flights of the infeed conveyor. This is done not only to form separate groups of work products from the row of work products, but also to ensure that the groups of work products are consistently sized into groups of a desired size and moved in spaced series into the flights of the infeed conveyor in timed relationship with the timing pins of the infeed conveyor to ensure a gradual and gentle "take over" of the group of work products by the infeed conveyor for movement along the path of travel.

Due to the unique interaction of the mechanical cam mechanism and the electronic cam mechanism of this invention, the separator knife is inserted into the row of work products at a first speed and direction substantially the same as the speed and direction of the row of work products on the feed conveyor upstream of the home position. Thereafter, when the separator knife is moved from the home position in the direction of the path of travel, it moves at a speed greater than the first speed for moving the row of work products into a side belt assembly at a speed equal to the speed of the side belts. Thereafter, the separator knife is then moved away from the row of work products at a third speed still greater than the second speed to ensure that the separator knife does not impede the progress of the row of work products along the path of travel.

Lastly, the electronic cam mechanism of this invention ensures that this cycle of separator knife insertion, dwell, movement, and removal occurs for each single flight of the infeed conveyor.

Thus, it is an object of this invention to provide an improved method and apparatus of forming groups of work product which is capable of producing groups of work products of any one of a number of multiple sizes without having to stop and re-tool or adjust the apparatus.

Yet another object of this invention is to provide an improved method and apparatus for forming groups of work products which can change the size of the groups of work products quickly and easily during packaging operations.

Still another object of this invention is to provide an improved method and apparatus for forming groups of work products which will change the sizes of the groups of work products automatically in response to the measurement of the groups of work products along the path of travel.

An additional object of this invention is to provide an improved method and apparatus which will receive one row of closely spaced, aligned, and vertically edged standing work products, and deliver one row of spaced groups of work products therefrom.

Another object of this invention is to provide an improved and relatively compact apparatus for forming groups of work products.

Yet another object of this invention is provide an improved method and apparatus of forming groups of work products which is simple in operation and design, is inexpensive to use and construct, and is durable and rugged in structure.

Thus, these and other objects, features and advantages of the invention will become apparent upon reading the specification when taken in conjunction with the accompanying drawings, wherein like characters of reference designate corresponding parts throughout the several views.

DETAILED DESCRIPTION

Figure 1:
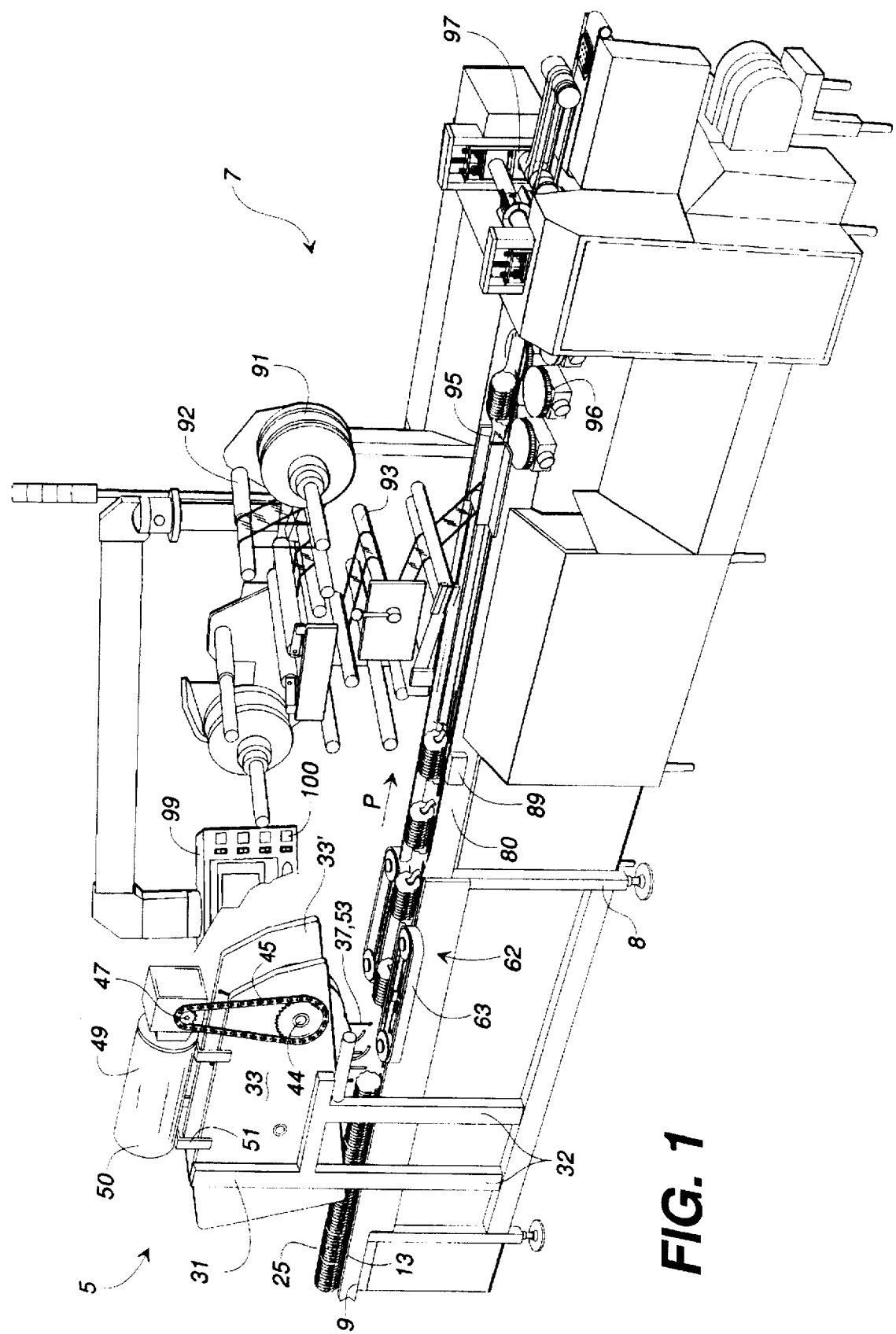
FIG. 1 is a perspective view of a preferred embodiment of the apparatus for forming groups of work products positioned along a path of travel extending toward a packaging machine.

Referring now in detail to the drawings, in which like reference numerals indicate like parts throughout the several views, numeral 5 of FIGS. 1–4 is a preferred embodiment of the apparatus for forming groups of work products of this invention. As shown in FIG. 1, apparatus 5 is positioned along a path of travel, denoted as "P", upstream of a packaging machine 7. Both apparatus 5 and packaging machine 7 are supported on framework 8.

Figure 2:
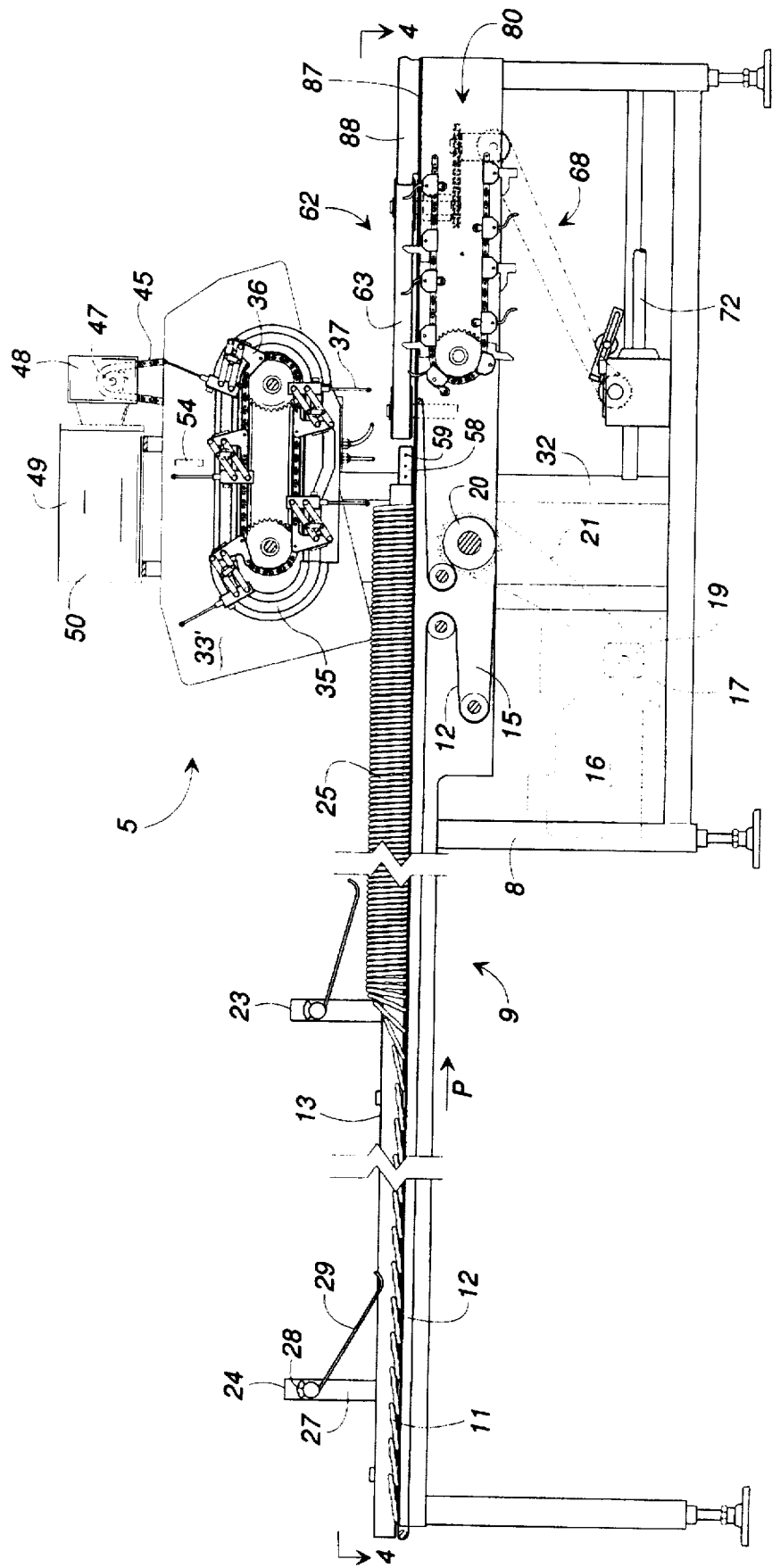
FIG. 2 is a partially cut-away side elevational view of the apparatus for forming groups of work products of FIG. 1.
Figure 3:
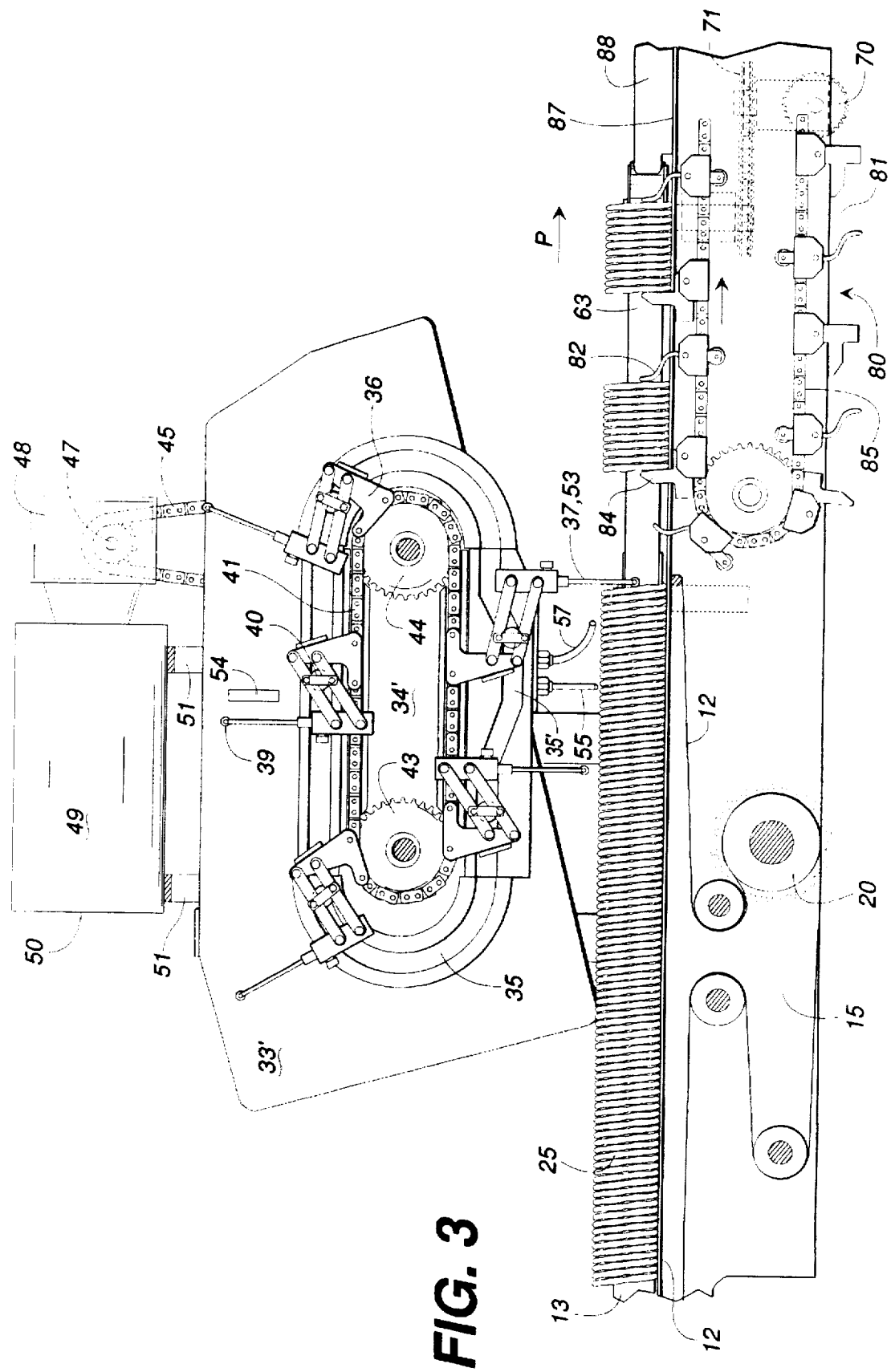
FIG. 3 is a partial and enlarged view of the apparatus for forming groups of work products of FIG. 2.

Upstream of apparatus 5 is a feed conveyor 9. As best shown in FIGS. 2 and 3, feed conveyor 9 is transporting a series of low shingled work products 11 along the path of travel toward apparatus 5. Work products 11 are being carried on a tape belt 12 which is substantially smooth so that when the work products are accumulated into a closely aligned and vertical edge standing relationship, the tape belt 12 will slide underneath the work products as they are being accumulated by apparatus 5 prior to being formed into groups of work products.

Figure 4:
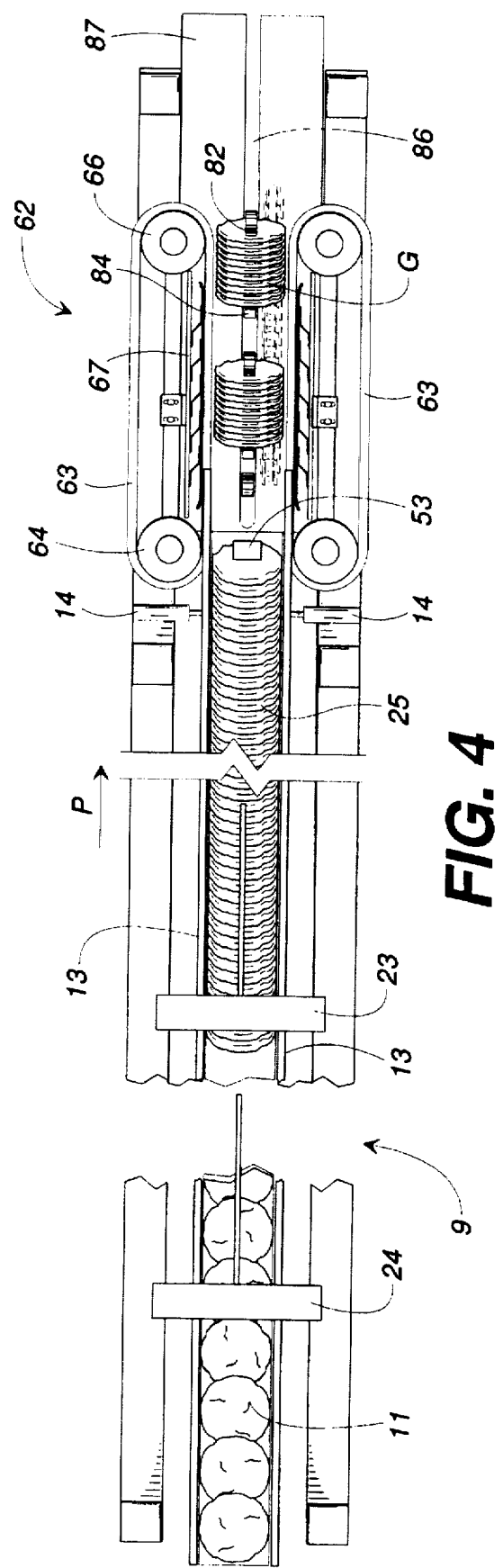
FIG. 4 is a partially cut-away top plan view along line 4—4 of FIG. 2.

Feed conveyor 9 includes a pair of side guides 13 (FIG. 4) extending along the length of the tape belt 12 and positioned on opposite sides thereof. A unique feature of feed conveyor 9 of this invention is shown in FIG. 4, in which a pair of opposed pneumatic double cylinders 14 are positioned at the downstream end of feed conveyor 9 on framework 8. Each of double action cylinders 14 has a cylinder rod (not illustrated) which extends from the cylinder to a pivotable connection (not illustrated) on the exterior of each side guide 13. Side guides 13 are not fastened to framework 8 at the downstream end of feed conveyor 9 and tape belt 12 so that the side guides may be moved toward and away from the path of travel. When actuated, cylinders 14 will move side guide, or guides 13 toward the row of work products being accumulated by apparatus 5 for aligning the work products prior to being separated into groups. The manner in which cylinders 14 are controlled is discussed in greater detail below.

Referring now to FIG. 2, tape belt 12 is provided with a tensioning assembly 15 in conventional fashion for properly tensioning the tape belt as it moves in an endless loop along the length of feed conveyor 9. Tape belt 12 is driven by drive motor 16, drive motor 16 being fastened to a gear reducer 17 having a drive sprocket 19 which moves a drive sprocket 20 formed as a part of tensioning assembly 15 with a drive chain, or belt, 21 in known fashion. Feed conveyor 9 may be supplied with work products at its upstream end from other conveyors, (not illustrated), from an accumulator (not illustrated), or directly from a baking oven.

Referring now to FIGS. 2 and 4, feed conveyor 9 is provided with a low speed prime sensor 23 spaced approximately 6 feet upstream of apparatus 5, and a high speed prime sensor spaced approximately 6 feet upstream of low speed prime sensor 23. Low speed prime sensor 23 is used to detect the presence of a row of vertical edge standing work products 25 at the downstream end of tape belt 12, as shown in FIG. 2. Each of prime sensors 23 and 24 has a frame 27 (FIG. 2) supported on framework 8, a detection sensor 28 positioned on the frame, and a detector arm 29 being operably fastened to the detection sensor for signaling the presence of edge standing work products 25 at low speed prime sensor 23 and/or high speed prime sensor 24.

As discussed in greater detail below, and as illustrated generally in FIG. 7A, apparatus 5 will not commence operation until a row of vertical edge standing work products 25 is detected at low speed prime sensor 23. Should vertical edge standing work products 25 be detected at high speed prime sensor 24, the speed of apparatus 5, as well as the speed of packaging machine 7, and thus infeed conveyor 80, is increased in order to accommodate the backlog of edge standing work products to prevent feed conveyor 9 from accumulating so many work products that the feed conveyor stalls the production line upstream of apparatus 5. Detection sensor 28 at each of prime sensors 23 and 24 is best likened to a limit switch which is actuated only when detector arm 29 is moved vertically upward to a pre-established position in accordance with the height of the row of vertical edge standing work product being accumulated on feed conveyor 9.

Referring now to FIG. 1, apparatus 5 is supported above tape belt 12 of feed conveyor 9 on a support framework 31, support framework 31 being fastened to framework 8. Support framework 31 includes two pairs of vertical supports 32, each pair of vertical supports 32 separately supporting frame plates 33 and 33' spaced equally apart from one another on opposite sides of the longitudinal axis, denoted by "A," of feed conveyor 9. Frame plates 33 and 33' are generally parallel to one another, and are identical to one another, but in opposite hand. Each frame plate 33 and 33' supports a cam plate 34 and 34' thereon, respectively, with a cam track 35 defined in each cam plate. In FIG. 3 only cam track 35 defined within cam plate 34' and supported on frame plate 33' is shown. A second cam track 35 is defined within cam plate 34 and is identical to cam track 35 as shown in FIG. 3, with the exception that each cam track is in opposite hand to the other on opposite sides of the longitudinal axis extending along the path of travel, and through apparatus 5.

Referring now to FIG. 3, cam track 35 is provided with a cam profile 35' for guiding each of a series of knife assemblies 36 downwardly toward edge standing work products 25. Each knife assembly 36 has a separator knife 37 formed as a part thereof. Knife assemblies 36 move within cam tracks 35, and cam profile 35', downwardly toward the accumulated row of edge standing work products 25 so that a separator knife 37 may be inserted vertically into the row of work products. Each of knife assemblies 36 is provided with a pair of cam followers 40, one cam follower 40 fitting within each cam track 35, for guiding the knife assemblies, and thus the separator knives, downward toward and into the row of work products as knife assemblies 36 are moved along the path of travel within cam track 35, and more particularly within cam profile 35'.

Knife assemblies 36 are moved along the path of travel by a chain conveyor 41 supported on an idler sprocket 43 and a drive sprocket 44, and positioned within cam track 35 between frame plates 33 and 33', and cam plates 34 and 34'. As shown in FIGS. 2 and 3, drive sprocket 44 is fitted to a drive belt 45, drive belt 45 being received on a drive sprocket 47 attached to a gear reducer 48. Gear reducer 48 is powered by a servomotor 49, servomotor 49 having an encoder 50 for reporting its position to control processor 99 (FIG. 1). Gear reducer 48 and servomotor 49 are supported above frame plates 33 and 33', and extend between the frame plates, on support brackets 51 fastened to the frame plates.

As best shown in FIGS. 2 and 3, one of separator knives 37 is shown at home position 53 fixed along the path of travel. At home position 53, separator knife 37 is in its downward-most dwell or delayed position so that the row of vertical edge standing work products 25 is accumulated upstream of separator knife 37 at home position 53 on tape belt 12. Home position 53 is detected by home position detector 54, illustrated in FIGS. 2 and 3, the home position detector being supported on apparatus 5 and reading the home position of one of knife assemblies 36 within cam track 35 corresponding to the position of separator knife 37 in home position 53 in relation to feed conveyor 9.

Apparatus 5 also includes a plurality of air jets for use in opening a gap in the row of vertical edge standing work products 25 so that separator knives 37 can be inserted downwardly therein, and also for holding the departing work products in a generally upright and vertical edge standing orientation as the groups of work products move away from the home position as shown schematically in FIGS. 8A–G. Thus, apparatus 5 includes a first pair of air jets 55 positioned approximately at home position 53, so that as separator knife 37 is moving along the direction of the path of travel at a speed and direction substantially the same as the speed and direction of the row of vertical edge work products 25, and as knife 37 is being moved vertically downward toward and into the row of work products while following cam profile 35', air jets 55 are activated in the fashion described in greater detail below to release a jet of compressed air directed into the row of edge standing work products, creating a gap in the row of work products for allowing separator knife 37 to extend downward into the row of work products 25 without damaging or breaking the work products. In order to assist separator knife 37 in being moved down into the row of work products, the downwardly extending end of each separator knife 37 is provided with an edge roller 39 so that the actual tip of the separator knife is a roller assembly which will roll over and between the vertical surfaces of the row of work products as it is extended down into the work products. This helps to ensure that the work products will not be damaged in undue fashion while they are being formed into groups by the apparatus.

A second pair of air jets 57 is also shown in FIGS. 2–3, positioned just downstream of air jets 55. Air jets 57 are constructed and arranged to direct a jet of compressed air toward the rearmost work products of the group of work products G (FIG. 1) being moved downstream and away from the home position as the separator knife 37 is inserted into the row of work products and arrives at the home position. This is shown schematically in FIGS. 8A–G. Air jets 57 thus help to ensure that the rearmost work products within a group of work products remain upright rather than falling downward into a horizontal orientation where they will otherwise jam or obstruct the path of travel for following groups of work products as they are received by side belt assembly 62, shown in greater detail in FIG. 3.

Referring to FIG. 2, apparatus 5 also includes a pair of guide blocks 58 positioned on opposite sides of the path of travel, downstream of the free and reciprocally moving ends of side guides 13 of feed conveyor 9. Each of guide blocks 58 includes a plurality of openings 59 defined therein and formed as air jets, each air jet being constructed and arranged to direct a jet of compressed air toward the lower portion of the rearmost work products of the group of work products departing the home position and moving within side belt assembly 62. Each of air jets 55, 57, and 59 are controlled to fire in unison by control processor 99, as described in greater detail below.

As each group of work products, shown schematically in FIGS. 8A–8G, depart apparatus 5, and more particularly home position 53 of apparatus 5, the group of work products is received within side belt assembly 62 shown in FIGS. 1–4. Side belt assembly 62 is positioned intermediate feed conveyor 9 and flighted infeed conveyor 80 along the path of travel. Side belt assembly 62 includes a pair of opposed vertical edge standing side belts 63 which extend along a portion of the path of travel. Each side belt 63 is supported on an idler pulley 64 and drive pulley 66. A pressure plate/belt guide 67 is positioned within each one of side belts 63 intermediate idler pulley 64 and drive pulley 66 to provide a guide surface for each side belt 63 as it moves along the path of travel, plate 67 also acting as a pressure plate for holding each of side belts 63 in position with respect to the work products received therein. Although not shown in greater detail in FIG. 4, each side belt 63 is formed of a soft resilient or foam like material constructed to yield to the vertical side edges of edge standing work products 25 as they are moved as a group through the side belt assembly 62 and toward flighted infeed conveyor 80. Each of the side belts includes a more rigid, yet flexible, rubber backing (not illustrated) which is received on pressure plates/belt guides 67 to minimize the sideways deflection of belts 63.

Each of side belts 63 is powered by a drive assembly 68, illustrated generally in FIGS. 2 and 3. Drive assembly 68 includes a series of drive sprockets 70 on which drive chains 71 are provided, drive chains 71 being driven by a sprocket (not illustrated) received on wrapper drive shaft 72 (FIG. 2) and powered by packaging machine 7. Packaging machine 7 also drives flighted infeed conveyor 80 with wrapper drive shaft 72.

A flighted infeed conveyor 80 is positioned on framework 8 downstream of side belt assembly 62, as illustrated in FIGS. 1–4. Infeed conveyor 80 has a spaced series of flights 81 formed by a front timing pin 82 and a rear timing pin 84 (FIG. 3). One flight cycle is equal to the distance from one rear timing pin 84 to following timing pin 84 of the next flight 81. Although not illustrated in greater detail, front timing pin 82 is spring loaded so that it may be urged in the direction of the path of travel by the groups of work products as they are received within flights 81, front timing pin 82 then acting to bias the group of work products in a rearward direction against rear timing pin 84 as the group of work products travels along the infeed conveyor toward the packaging machine.

In known fashion, infeed conveyor 80 includes a chain conveyor 85 on which the front and rear timing pins are supported, the timing pins extending upward through a central and continuous slot 86 defined within a dead plate 87 for sliding the groups of work products "G" along the path of travel. A pair of opposed side guides 88 are fixed on dead plate 87 on opposite sides of the path of travel, and are spaced equidistant from one another. Although not illustrated in greater detail, side guides 88 may be moved toward and away from the path of travel so that the infeed conveyor may be adjusted to receive groups of work products of varying diameter or width.

Positioned along the infeed conveyor 80 is a checkweight sensor 89 used to measure the weight of each group of work products as it is passed thereby in order to verify that the groups are of the desired size for being packaged within packaging machine 7. Although it is not shown here, checkweight sensor 89 may be provided as a part of an apparatus for ejecting or otherwise removing groups of work products which are either oversized, or undersized, with respect to the desired group size of work products to be packaged in packaging machine 7.

After the edge standing row of work products 25 have been formed into groups G moved along the path of travel within flights 81 of infeed conveyor 80 (FIG. 1), they are passed toward packaging machine 7, which forms a tube of thermoplastic packaging film 91 about the groups of work products. As shown in FIG. 1, packaging machine 7 includes a roll, or rolls, of thermoplastic packaging film 91, the packaging film being passed over a series of idlers/take-up rollers 92, and through a drive or nip roller 93, and then passed to a film forming shoe 95. At forming shoe 95 the thermoplastic packaging film is formed as a continuous and open ended tube about the groups of work products, whereupon the lengthwise edge of the packaging film is received within fin wheels 96 in which a fin seal is formed so that a closed but open ended tube of packaging film is formed around the work products. Thereafter, and in known fashion, the entubed groups of work products are passed to a sealing and crimping head assembly 97, at which point end seals are formed, and the groups of work products are cut apart from one another within their plastic film wrappers.

Packaging machine 7 is provided with a control processor 99 (FIGS. 1 and 5) which is adapted to operate not only packaging machine 7, but also apparatus 5. In those instances where apparatus 5 is being used with a packaging machine which does not have its own control processor adapted to also control the apparatus for forming groups of work products, apparatus 5 will be provided with its own control processor 99 (not illustrated). For reasons discussed in greater detail below, control processor 99 is provided with an advance/retard switch 100 for phasing the groups of work products from apparatus 5 through side belt assembly 62 into flights 81 of infeed conveyor 80.

As shown in FIGS. 1–4, the components of apparatus 5, as well as feed conveyor 9, side belt assembly 62, and flighted infeed conveyor 80, are conventional conveyor belt assemblies known to those in the food processing and handling art. Packaging machine 7 may be any conventional wrapper or sealer of a type known in the art, but may also include the Mach 3 wrapper manufactured by Food Machinery Sales, Inc. of Athens, Ga., and more fully disclosed in pending U.S. application Ser. No. 08/543,346 filed on Oct. 17, 1995.

Figure 5:
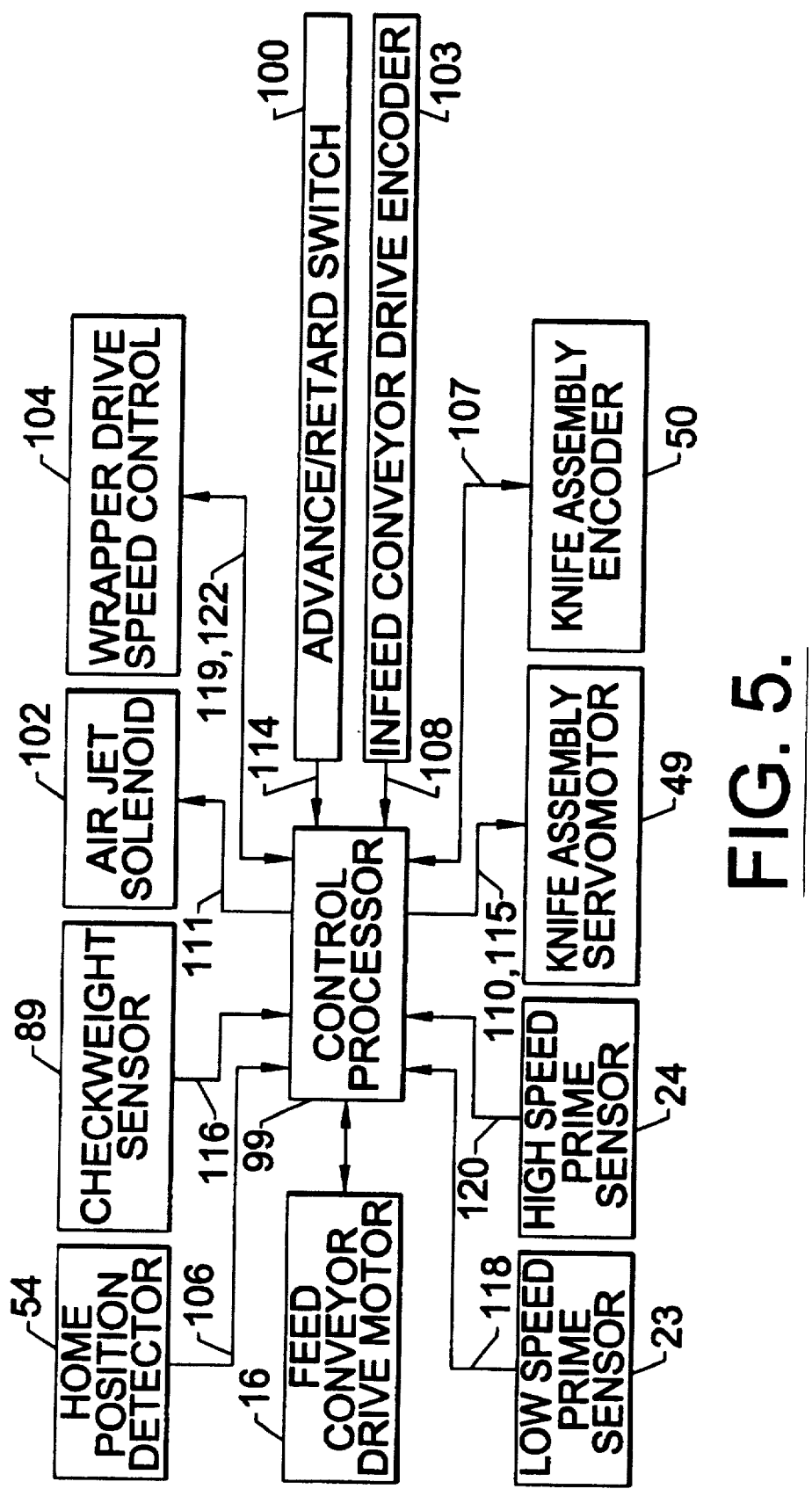
FIG. 5 is a schematic illustration of the control system of the apparatus for forming groups of work products of FIG. 2.

A schematic illustration of the control system employed by the apparatus of this invention is disclosed in FIG. 5. Control processor 99, formed as a part of packaging machine 7 in this instance, receives data signals from several sources as well as emitting control signals to several remote sensors and/or motors. Thus, as shown in FIG. 5, control processor 99 is in electronic communication with feed conveyor drive motor 16, low speed prime sensor 23, high speed prime sensor 24, servomotor 49, encoder 50, home position detector 54, checkweight sensor 89, and advance/retard switch 100. In addition, control processor 99 is in electronic communication with an air jet control solenoid, or solenoids, 102, the solenoid being adapted to control air jets 55, 57 and 59, as well as pneumatic cylinders 14. Control processor 99 is also in electronic communication with an infeed conveyor drive encoder 103, and a wrapper drive speed control 104. In the event that infeed conveyor 80 is formed as a part of packaging machine 7, for example, then it is anticipated that infeed conveyor drive encoder 103 will in fact be replaced by drive position signals emitted by either a virtual drive motor (not illustrated) programmed and stored within control processor 99, or will receive drive position signals from an encoder (not illustrated) attached to the servomotor driving either packaging machine 7 and/or infeed conveyor 80.

In packaging machines of the type shown in FIG. 1, a virtual motor is sometimes used to control the timing of all the remote servomotors within the machine line, and it will be this data signal that will be used to coordinate the movement of knives 37 of apparatus 5 with flights 81 of infeed conveyor 80 for forming, sizing, and spacing, the groups of work products as they are moved along the path of travel. Thus, wrapper drive speed control 104 will control the speed of packaging machine 7, and/or may also be the device which controls the speed of a separate drive motor (not illustrated) used to power infeed conveyor 80. In the event that apparatus 5 is used with a packaging machine that is not controlled by a central processor adapted to also control apparatus 5, then apparatus 5 will either be supplied with an infeed conveyor drive encoder signal 103 from the servomotor used to drive infeed conveyor 80, if applicable, or a digital encoder (not illustrated) mechanically driven by flighted infeed conveyor 80. This separate data signal will be used to signal the drive position of flights 81 to control processor 99 in order to accomplish the group forming process described in greater detail below.

Referring to FIG. 5, control processor 99 will receive a detection signal 106 from the home position detector 54, a servomotor (knife assembly) drive position signal 107 from encoder 50, and a flight position signal 108 emitted from infeed conveyor drive encoder 103. As discussed, the source of flight position signal 108 may vary depending on the construction and arrangement of packaging machine 7 with relation to infeed conveyor 80, as used with apparatus 5.

Still referring to FIG. 5, in response to these signals control processor 99 emits a dwell control signal 110 to servomotor 49, an air jet control signal to air jet solenoid (solenoids) 102, and a feed conveyor speed control signal 112 to feed conveyor drive motor 16. Control processor 99 is also constructed to receive a phase adjustment signal 114 from advance/retard switch 100, and will emit a phase control signal 115 to servomotor 49 in response thereto, as described in greater detail below.

Control processor 99 is also adapted to receive a checkweight signal 116 from checkweight sensor 89, the check weight signal being compared against an electronic cam profile stored within control processor 99 (see FIG. 5), whereupon control processor 99 will automatically emit a new dwell control signal 110 to servomotor 49 for increasing or decreasing the size of the groups of work products in order to fit the size of the groups within the electronic cam profile calculated and/or preprogrammed and stored within the control processor.

Lastly, and as illustrated in FIG. 5, low speed prime sensor 23 emits a low speed prime signal 118 to control processor 99, the control processor in turn emitting a first run control signal 119 to wrapper drive speed control 104. In similar fashion, should high speed prime sensor 24 emit high speed prime signal 120, indicating the presence of vertical edge standing work products 25 at the high speed prime sensor, control processor 99 will emit a second run control signal 122 to wrapper drive speed control 104 for the purpose of increasing the speed of packaging machine 7 and infeed conveyor 80.

Figure 6:
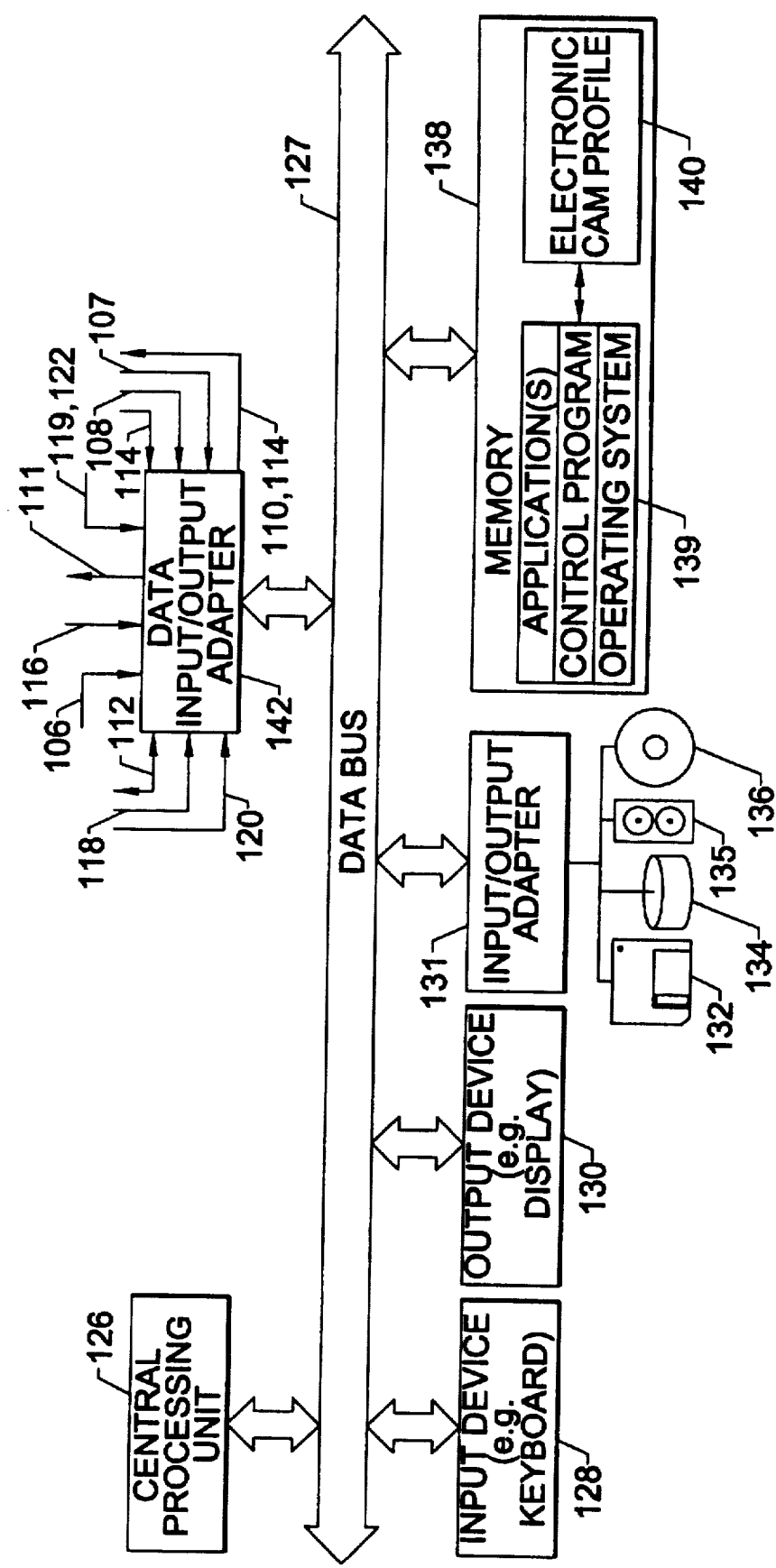
FIG. 6 is schematic illustration of the control processor of FIG. 4.

Control processor 99 is schematically illustrated in greater detail in FIG. 6. Control processor 99 is a computer which reads and executes computer programs stored on any suitable computer-readable medium for use in automatically controlling apparatus 5. Control processor 99 has a central processing unit 126, the central processing unit being in electronic communication with a data bus 127. Data bus 127 is also in communication with an input device 128, for example a keyboard; an output device 130, for example a display monitor; an input/output adapter 131 for uploading and downloading data stored on computer readable media; a computer memory 138; and a data input/output adapter 142 for receiving signals 106, 108, 114, and 120 illustrated in FIG. 4, as well as for emitting control signals 107, 110, 111, 112, 115, 112 illustrated in FIG. 4. It is anticipated that control processor 99 will be an IBM PC compatible computer in which central processing unit 126 will be an Intel, or compatible, 486 DX/266 mhz clock speed chip at a minimum.

Input device 128 will typically be a keyboard, or other data entry source feeding data directly into data bus 127. Output device 130 will typically be a display monitor so that the operations being controlled by control processor 99 can be monitored during packaging operations, as well as for visually observing the data entered into, and reported by, control processor 99.

Input/output adaptor 131 serves as the portal through which data is input into memory 131 when the data is contained in a portable storage container, examples of which are a floppy disk 132, adapted for use with a floppy disk drive (not illustrated), or a hard disk drive 134, a magnetic/digital tape 135 with a digital tape drive (not illustrated), or the data may be stored on a CD rom 136, control processor 99 then being equipped with a CD rom reader (not illustrated).

Memory 138 will call the appropriate operating programs from one of the computer readable media, i.e., portable storage containers, 132, 134, 135 or 136, for execution by central processing unit 126. Memory 138 contains control program 139 used to control the operations of apparatus 5, and a program for calculating an electronic cam profile 140. Electronic cam profile 140 may either be programmed on the fly, or may be a preprogrammed data table. The electronic cam profile is based on the position of infeed conveyor drive encoder 103 with respect to encoder 50 over its range of 4,096 discrete positions, or 360°, if so preferred, of relative movement with respect to the other. Thus, electronic cam profile 140 will compute and/or read a cam profile of when separator knife assembly 36 should be moved along the path of travel within cam track 35 at substantially the same speed and direction as that of edge standing work products 25 while moving on feed conveyor 9, and when a knife 37 from one of the knife assemblies will be inserted downward into the row of edge standing work products by moving along physical cam profile 35', when knife 37 will be stopped at home position, when knife 37 will be moved in the direction of the path of travel at the same speed as side belts 63, and when knife 37 will be moved upward and away from in front of the row of vertical edge standing work products 25 at a speed greater than the speed of side belts 63. If stored as a preprogrammed data table, electronic cam profile 140 will include a series of data tables/cam profiles for the anticipated variety of sizes and configurations of groups of work products to be formed by apparatus 5.

Data input/output adapter 142 shown in FIG. 6 is the portal through which the data and control signals illustrated schematically in FIG. 5, flow through data bus 127 for processing by central processing unit 126 in association with control program 130 and electronic cam profile 140. Thus, and as shown in FIG. 6, data input/output adapter 142 receives detection signal 106, servomotor drive position signal 107, and flight position signal 108. In return, data input/output adapter 142 will emit dwell control signal 110, air jet control signal 111, and feed conveyor speed control signal 112. The data input/output adapter will also receive any phase adjustment signals 114 from advance/retard switch 100, and will emit the appropriate phase control signal 115 to servomotor 49 in response. The data input/output adapter will also receive checkweight signal 116 from checkweight sensor 89 which will be used by control processor 99 to modify dwell control signal 110. Lastly, data input/output adapter 142 will receive low speed prime signal 118, and high speed prime signal 120, when applicable, and in turn will emit first run control signal 119, and/or second run control signal 122, respectively, to wrapper drive speed control 104 (FIG. 5).

As shown in FIG. 6, control processor 99 is conventionally constructed. Although it is anticipated that control processor 99 will be an IBM PC compatible computer as described above, it is also anticipated that control processor 99 could be any suitable computer capable of performing the operations of apparatus 5 as schematically illustrated in the flow charts of FIGS. 7A–7C.

OPERATION

Figure 7A:
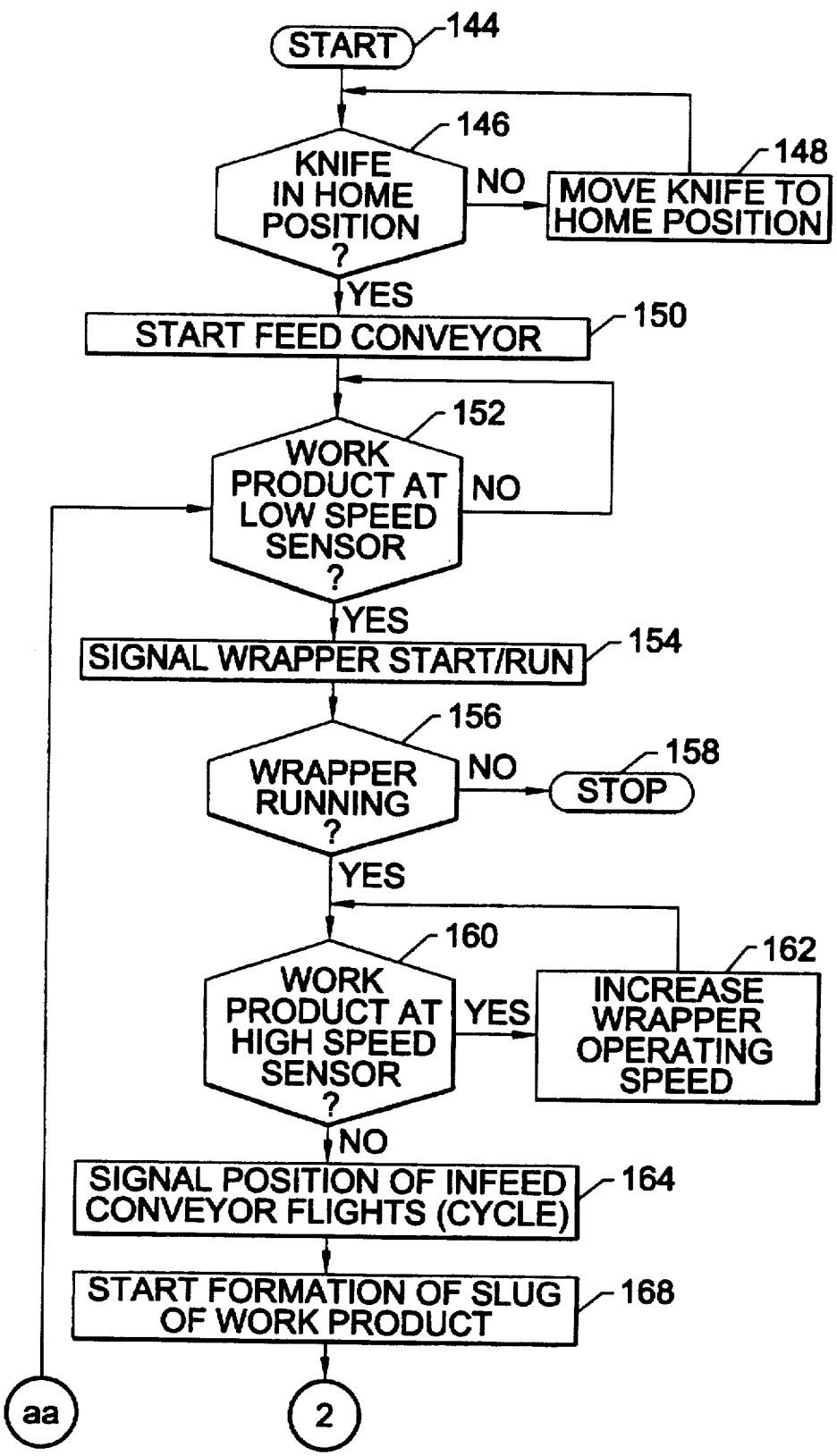
FIGS. 7A–C are sequential flow charts illustrating the operational steps practiced by this invention.
Figure 7B:
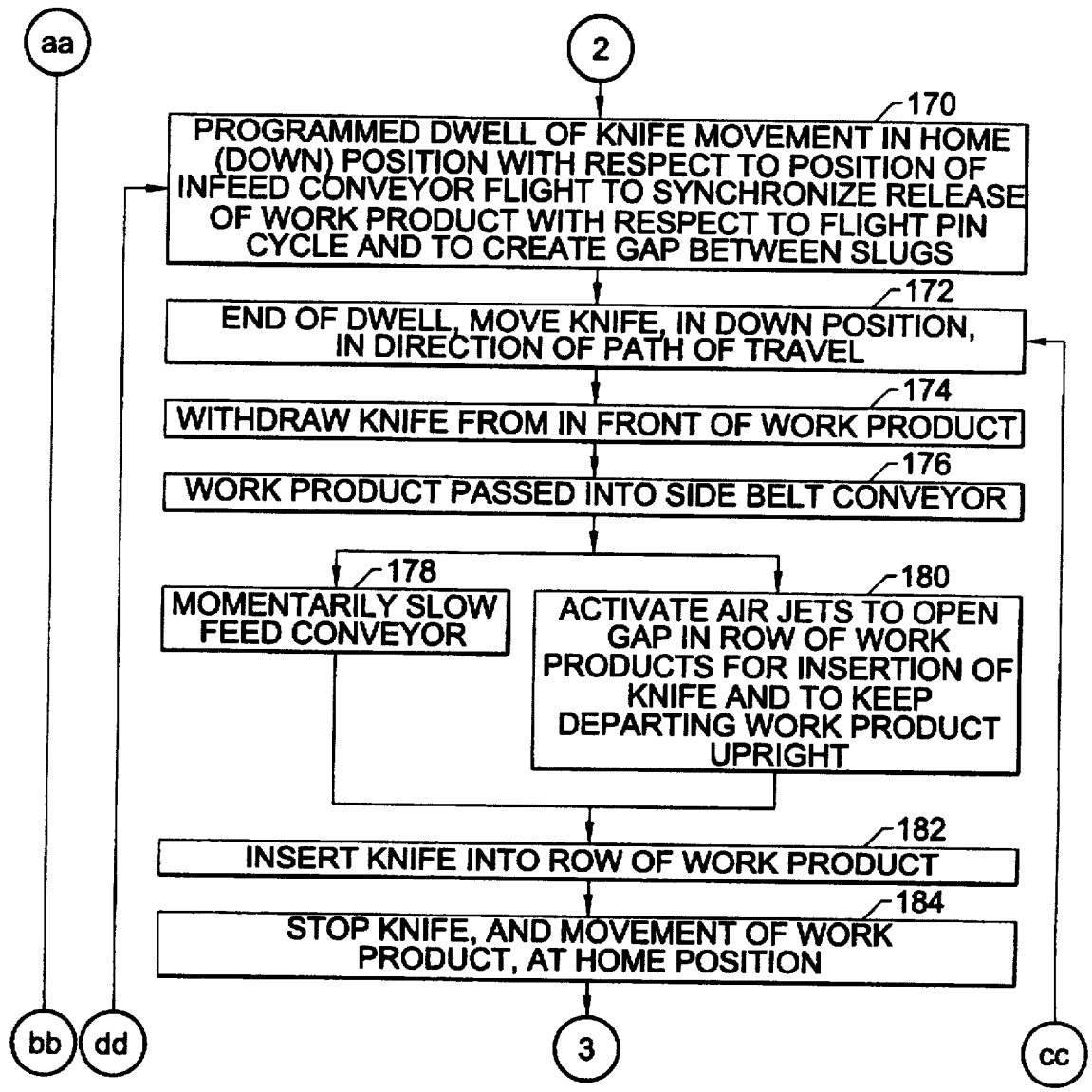
Figure 7C:
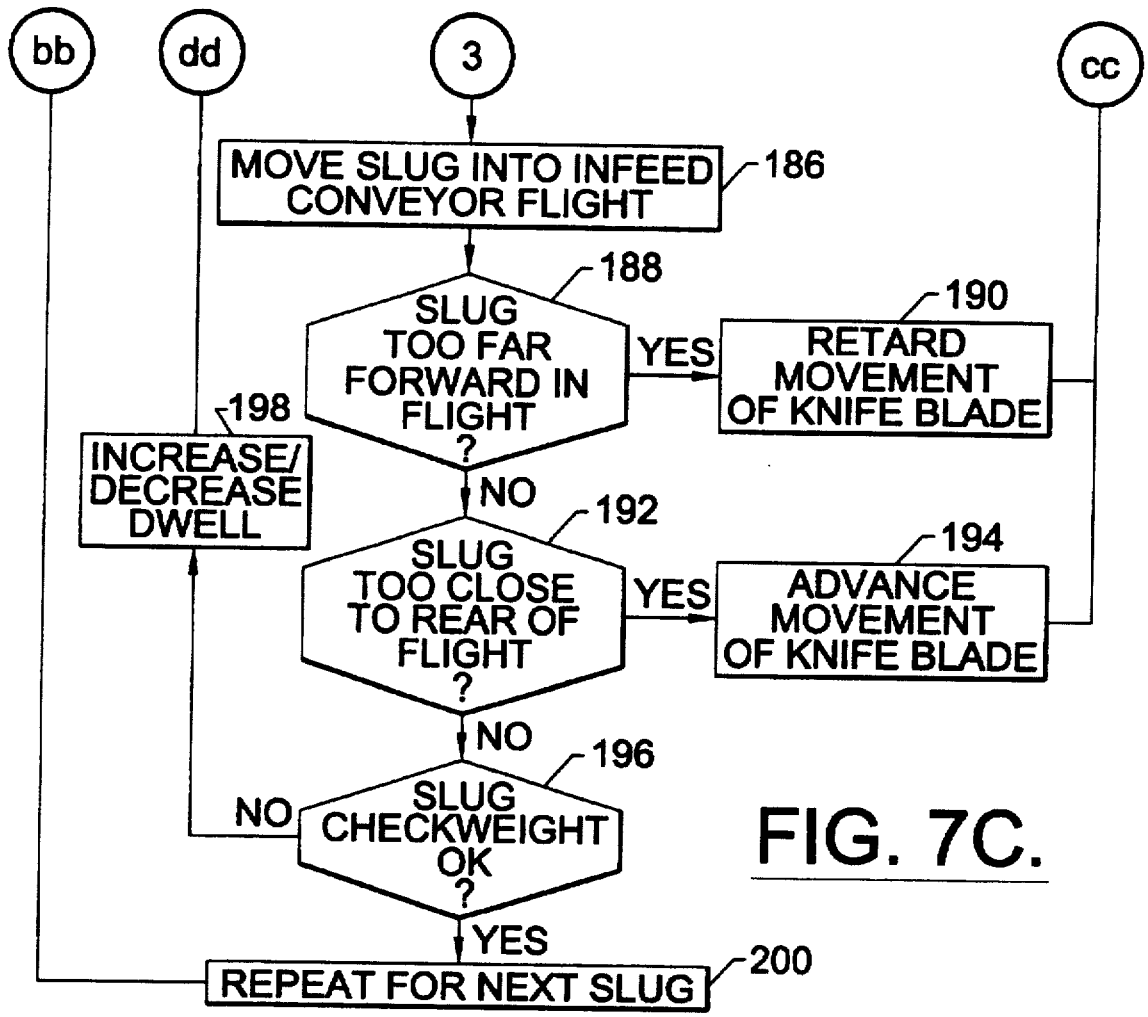

The method of operating apparatus 5 is illustrated schematically in the flow charts of FIGS. 7A–7E, and in the schematic illustrations of FIGS. 8A–8G, which detail the formation of groups of vertical edge standing work products 25 by apparatus 5. It is understood by those skilled in the art that steps 144 through 198 of FIGS. 7A–C represent discrete blocks of executable programming code, the assembled blocks of code comprising control program 139. Control program 139 utilized in this process is programmed, or coded, in the AML® motion control language developed by Pacific Scientific Company of Newport Beach, Calif. AML® is programming code designed specifically for use with motion control systems such as apparatus 5. The AML® modules, represented by blocks 144–198, that together make up control program 139 are coded to respond to various events as they occur and are detected either internally through the use of programmable limit switches, for example one being used to actuate air jets 55, 57 and 59, or externally as by home position detector 54.

Turning first to FIG. 7A, the first step performed in forming distinct groups of work products with apparatus 5 is to start the apparatus in step 144. After starting the apparatus, typically accomplished by manually pressing a run/start switch (not illustrated), control processor 99 will then poll home position detector 54 (FIG. 5) in step 146 to determine whether a knife assembly 36, and thus a separator knife 37, is located at home position 53 along the path of travel with respect to feed conveyor 9, as illustrated in FIGS. 2 and 3. As described above, in the home position one of knives 37 will be extended downwardly either into a row of vertical edge standing work products 25, or will be extended downward into the home position for accumulating vertical edge standing work product 25 upstream thereof on feed conveyor 9 before a "primed" row of vertical edge standing work products is formed on feed conveyor 9. The home position of knife 37 is also indicated schematically in FIGS. 8A–8B and 8G.

If knife 37 is not in its home position, step 148 is performed in which one of knife assemblies 36/separator knives 37 is moved into the home position, the control program looping back to step 146 to once again determine whether the knife assembly/separator knife is in the home position. If so, step 150 is executed in which feed conveyor 9 is started by a feed conveyor speed control signal 112 emitted by control processor 99 for running the feed conveyor to accumulate work product at home position 53.

Thereafter, once feed conveyor 9 has been started, and work product begins to accumulate and form a vertical edge standing row of work products on feed conveyor 9, step 152 is executed in which the computer polls low speed prime sensor 23 (FIG. 5) to determine whether the control processor detects low speed prime signal 118, thus signaling the presence of the "prime" or accumulated row of vertical edge standing work products 25 required prior to forming the work products into groups. If accumulated edge standing work products are not detected at low speed sensor 23, the program will loop back on itself until it detects an accumulated prime of work products. Once this is done, the program will execute step 154, in which it signals wrapper drive speed control 104 with a first run control signal 119 (FIG. 5) to start packaging machine 7 and infeed conveyor 80.

The control program then polls the wrapper to determine whether it is running by looking for a flight position signal 108 from infeed conveyor drive encoder 103, signaling that packaging machine 107 and infeed conveyor 80 are in fact moving and are ready to receive groups of work product. If the control program does not detect a flight position signal 108 showing that the infeed conveyor is moving, then step 158 is performed in which apparatus 5 is stopped, requiring that the run/start button be pressed manually once again to restart the apparatus and the control program. If a flight position signal 108 is detected, which indicates that infeed conveyor 80 is moving, control processor 99 then polls high speed prime sensor 24 in step 160 to determine whether work product is accumulated in a vertical edge standing relationship at high speed prime sensor 24 by looking for high speed prime signal 120 (FIG. 5). If high speed prime signal 120 is detected, step 162 is performed in which control processor 99 will emit second run control signal 122 to wrapper drive speed control 104 to increase the speed of packaging machine 7, and more particularly, the speed of infeed conveyor 80, so that the accumulated row of edge standing work products can be processed more quickly to prevent apparatus 5 from slowing down or stopping upstream production of the work products.

After step 160 is performed, and assuming work product has not been detected at high speed prime sensor 24, the control program executes step 164 in which it signals the position of infeed conveyor flights 81, on a cycle by cycle basis measured from the rear of one flight pin to the rear of the next following flight pin, to central processing unit 126. Central processing unit 126 then starts the formation of slugs, or groups, of work product in step 168 pursuant to the instructions of control program 139 and electronic cam profile 140.

Referring now to FIG. 7B, as one of separator knives 37 has been detected in its home position 53 (FIG. 3, FIGS. 8A–D) as the starting point for the operation of apparatus 5, control program 139 will either calculate or read out the electronic cam profile 140 for the designated work product sizes(s) and desired group size(s) of work products, and will dwell the movement of knife 37 in the home position, i.e., it will delay or stop the movement of knife 37 at the home position for the preprogrammed portion of the cycle of one of flights 81.

For example, if the physical distance between rear timing pins 84 is 6 inches, and a three inch slug of work product is desired, separator knife 37 will dwell in the home position for three inches of movement of one of flights 81 so that a three inch gap will be formed between the groups of work product (FIGS. 8D–F), as they move from home position 53 through side belt assembly 62 and into one of the flights 81 of infeed conveyor 80.

Another way of measuring the dwell of knife 37 with respect to the motion of flights 81 of infeed conveyor 80 is to use the relative angular motion of the wrapper/infeed conveyor servomotor drive (not illustrated) with respect to servomotor 49 used to drive separator knives 37 along cam track 35. For example, if the distance between rear timing pins is 6 inches, which equates to one flight cycle, than a 360° phase of rotational movement will occur for each cycle of flights 81 as the groups of work products are formed. Thus, if a 3 inch slug of work product is to be formed, servomotor 49 will dwell for 180° of relative motion between one of flights 81 and separator knife 37 at its home position prior to starting the movement of separator knife 37 along the path of travel for releasing the row of work products into side belt assembly 62 so that three inches of work products will travel underneath the next following separator knife 37 (FIGS. 2, 3, 8C.F) into side belt assembly 62. Servomotor 49 moves the next following separator knife 202 (FIGS. 8D,G) downwardly into the home position within the row of edge standing work products 25 within the remaining 180° of servomotor's 49 rotation relative to the rotation of the motor or device powering infeed conveyor 80 for that flight cycle.

The preprogrammed dwell of knife 37 creates the slugs or groups of work product which move along infeed conveyor 80 toward packaging machine 7. When the knife is in its dwell position no work product can pass along feed conveyor 9 through side belt assembly 62 and into infeed conveyor 80 creating a gap between the work products being accumulated on feed conveyor 9 upstream of the home position, and the now departing slug of work products. Once knife 37, while in its down position, is moved in the direction of the path of travel shown in step 172 of FIG. 7B, the row of work products begins to move along the tape belt 12 of feed conveyor 9. However, when separator knife 37 begins moving in step 122 in the direction of the path of travel, it is moved approximately one inch in the direction of the path of travel at a speed greater than the speed of work products 25 on tape belt 12 so that it in essence allows the row of work products 25 to accelerate to the surface speed of side belts 63 based on the overspeed of tape belt 12 with respect to the speed of selector knife 37, side belts 63.

In step 174, therefore, the row of work products enters side belt assembly 62 by being received between side belts 63, whereupon servomotor 49 is controlled by control program 139 in conjunction with electronic cam profile 140 to then move separator knife 37 from out of in front of the row of work products at a speed still greater yet than the speed at which the knife moved the work products into the side belt assembly. Thereafter, a continuous row of work product is passed into side belt assembly 62 unimpeded by any one of separator knives 201, 202 (FIG. 8C, 8F), all of the separator knives traveling on that portion of cam track 35 in which the knives are held above the row of work products. During this period of the process, however, the separator knives are still being moved in the direction of the path of travel so that the next following separator knife 202, as shown schematically in FIGS. 8C and 8D, is in position to then be moved at a rate of speed substantially the same as the rate of speed of the row of edge standing work products on tape belt 12, and moved downwardly into the row of edge standing work products when cam follower 40 of knife assembly 36 moves along cam profile 35 for directing the separator knife 37 downward into the row of edge standing work products 25, whereupon the knife is then stopped at home position 53. Once separator knife 37 is stopped, the remainder of the row of work products moves downstream along the path of travel through side belt assembly 62, and a gap is formed between the departing and now formed group of work products 210 (FIG. 8D), and the row of work products 25 being accumulated upstream of the home position on feed conveyor 9. Thereafter, based upon the relative movement of one of flights 81 with respect to servomotor 49, as determined by control processor 99, the process is repeated whereupon successive and spaced groups of work product 210, 211 (FIG. 8G) are formed in series and passed separately into the flights of the infeed conveyor for transport to packaging machine 7.

Referring now to FIG. 7B, once the row of work products 25 has been passed into side belt conveyor in step 176, and is moving in continuous fashion into the side belts, the control program is moving the next following separator knife 202 (FIG. 8C, 8D) so that it may be prepared for insertion into the row of work products. This is done, as described above, by moving the knife assembly at the same speed and in the same direction as the speed and direction of the row of work products along tape belt 12. However, in order to facilitate the insertion of the separator knife into the row of work products, control processor 99 will emit a feed conveyor speed control signal 112 for momentarily slowing tape belt 12, step 178, while simultaneously emitting air jet control signal 111 (step 180) which will signal air jet solenoid 102 (FIG. 5) to release a jet of compressed air through air jets 55, 57, and 59, as well as to cylinders 14 for aligning the row of work products and to open a gap in the row of work products as knife 37 is being inserted into the row of work products in order to minimize damage to the work products. Air jets 57 and 59 are directed toward the departing group of work products, and blow a jet of compressed air toward the rear most articles of work product in the group to keep them in a generally upright edge standing orientation as the group of work products is moved further into side belt assembly 62. This is done in order to prevent the work products from falling into a horizontal attitude below the edge standing side belts 63 of the side belt assembly, which might then jam apparatus 5.

Thus, as shown in FIG. 7B, step 182 is then performed in which the next succeeding separator knife is inserted into the row of work products. This is also shown schematically in FIGS. 8A–8D, in which a first knife 201 is shown moving from the home position approximately 1 inch in the direction of the path of travel in FIG. 8B, knife 201 then being moved upward by cam profile 35' into a raised position so that the row of work products moves into the side belt assembly as shown in FIG. 8C, and whereupon the next succeeding knife 202 is inserted downwardly into the row of work products to create a gap indicated by the notation "g" between the now departing remainder of the row of work products and the accumulated work products being held at home position 53 by knife 202. This is also illustrated by step 184 of FIG. 7B, in which knife 202 is stopped at home position 53 and work product 25 is once again accumulated on tape belt 12 upstream of the home position.

Turning now to FIG. 7C, in step 186, a slug, or group of work products is moved into one of the flights 81 of infeed conveyor 80, shown generally in FIG. 8D. Thereafter, based on a position sensor (not illustrated) step 188 is performed in which it is determined whether the slug of work products is too far forward within flight 81, for example it is too far forward against front timing pin 82. If so, step 190 is performed in which the movement of separator knife 37 is retarded by looping back to step 172 to signal control processor 99 to retard the delivery of subsequent groups of work products to flight 81. This is done by advancing or retarding servomotor 49 in relation to the position of flights 81 as reported by infeed conveyor drive encoder 103. Although this may resemble the dwell of separator knife 37 at the home position, this step differs in that this is a one time retard or advance of the home position to phase the remaining groups of work products with the infeed conveyor. By retarding or advancing the movement of separator knife blade 37 in steps 190 and 194, the size of the group of work products is not changed or varied, i.e., the dwell control signal 110 remains constant.

Referring again to FIG. 7E, if the group of work products is not to far forward within flight 81, the computer then polls a position sensor (not illustrated) to determine whether the slug is to close to the rear of the flight, i.e., rear timing pin 84, which would have the effect of crushing the rearmost work products as the rear timing pin comes up through continuous central slot 86 within dead plate 87 and takes over and moves the group of work products out of side belt assembly 62. If the slugs are to close to the rear of the flight, the movement of knife blade 37 is advanced or accelerated in step 194, which once again loops back to step 172 to signal a phase shift. This is illustrated schematically in FIG. 5 in which control processor 99 receives a phase adjustment signal 114 from the position sensor (not illustrated) or from a manual input, for example advance/retard switch 100, control processor 99 emitting phase control signal 115 in response thereto to knife assembly servomotor 49.

Thereafter, step 196 of the control program is performed in which the size, i.e., the weight of the groups of work products moving along the path of travel is checked by checkweight sensor 89. If the size of the group is okay, the control program executes step 198 in which it loops back to step 152 to once again perform the entire cycle for each group of work products so formed. If, in step 196, the slug checkweight does not pass the preprogrammed check weight size, the program proceeds to step 198 in which the dwell control signal 110 is either increased or decreased by either calculating or reading out a new electronic cam profile 140, whereupon the program loops to step 170 to adjust the dwell control signal for each succeeding group of work products to be formed until the checkweight sensor 89 detects that the desired size slugs are being formed.

A unique feature of apparatus 5, however, not heretofore known in the art is that apparatus 5 can automatically increase or decrease the size of the groups of work products as they move along the path of travel due to its construction and the unique interaction of its mechanical and electronic cam elements to control the movement and insertion of separator knives 37 into the row of work products. Thus, and if so desired, being limited only by the physical size of flights 81, apparatus 5 can automatically form each group of work products to be of a different size from the other based on the needs and requirements of the packaging operation, and/or the data entered into control program 139 by electronic cam profile 140. This is made possible by removing separator knife 37 from in front of the row of work products (FIGS. 8C, 8F), and allowing a continuous and uninterrupted row of work products to flow through, i.e., underneath, apparatus 5 and into side belt assembly 62, through side belt assembly 62, and into infeed conveyor 80. If infeed conveyor 80 did not contain flights 81, it would be possible that a continuous and uninterrupted stream of work products 25 could be moved downstream along the path of travel without every forming a slug, or forming a slug 5, 10, 15, or 20 feet long, if so desired. This, however, will not likely be the case as packaged slugs of work product of this size are generally not desired.

Figure 8A:
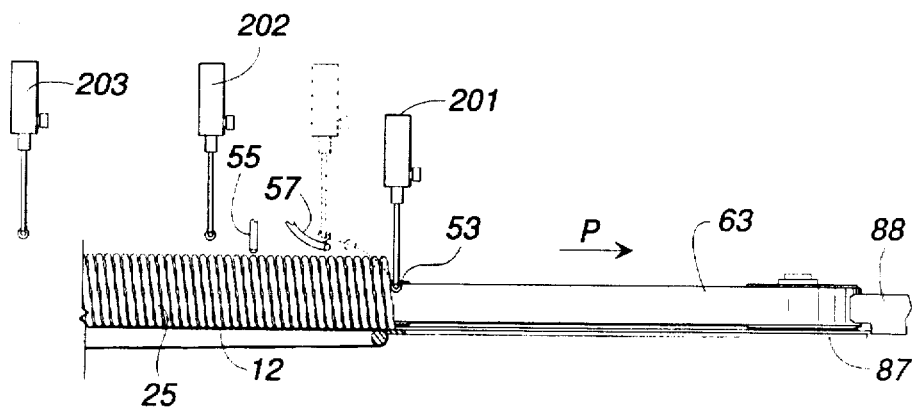
FIGS. 8A–G are sequential schematic illustrations of the apparatus of FIG. 1 forming groups of work products.
Figure 8B:
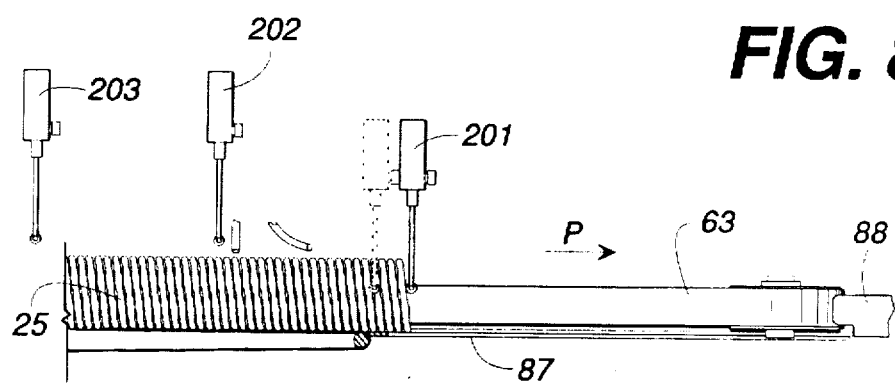
Figure 8C:
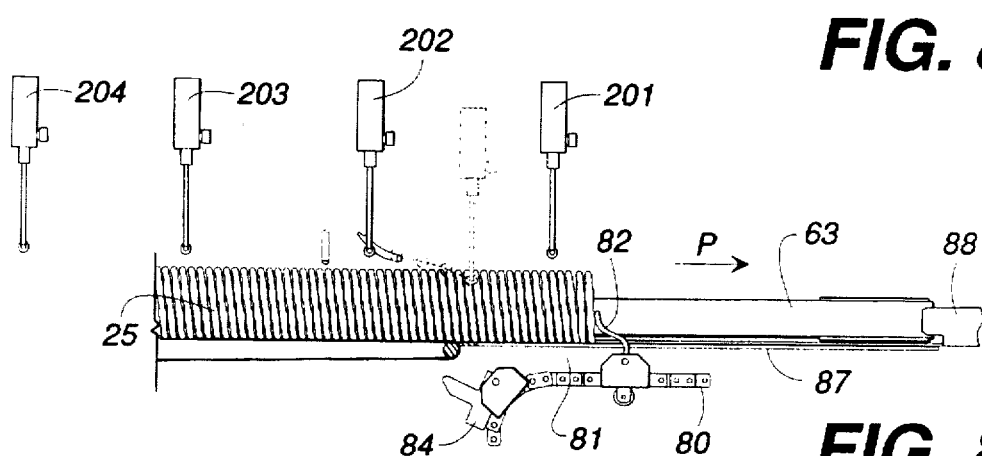
Figure 8D:
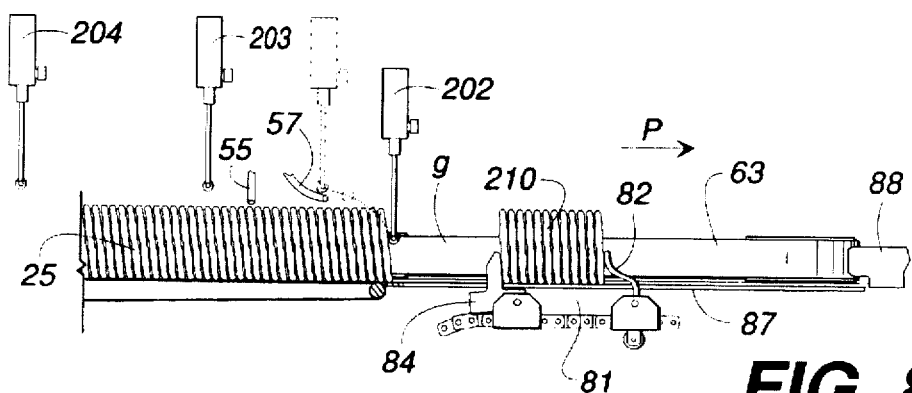
Figure 8E:
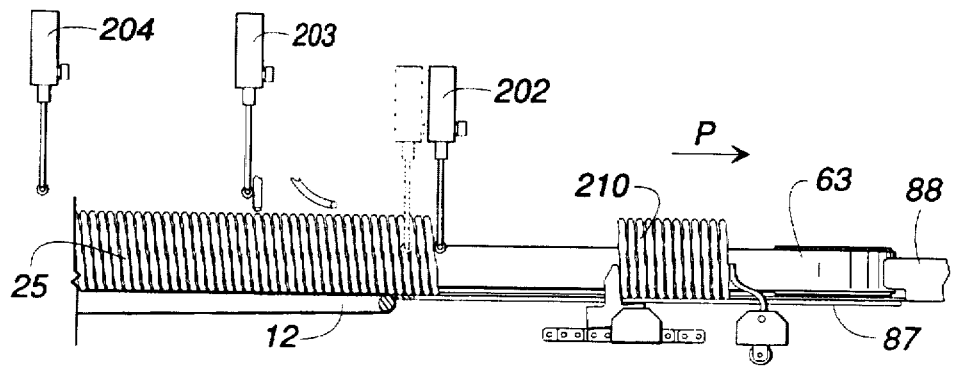
Figure 8F:
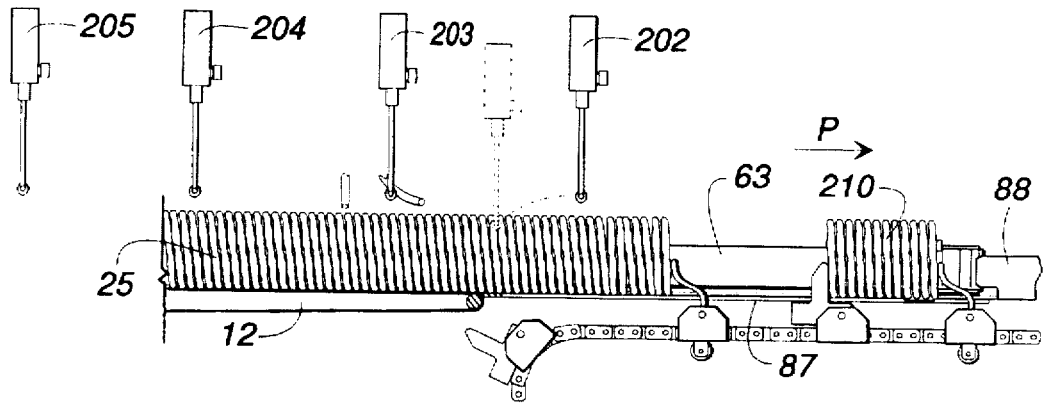
Figure 8G:
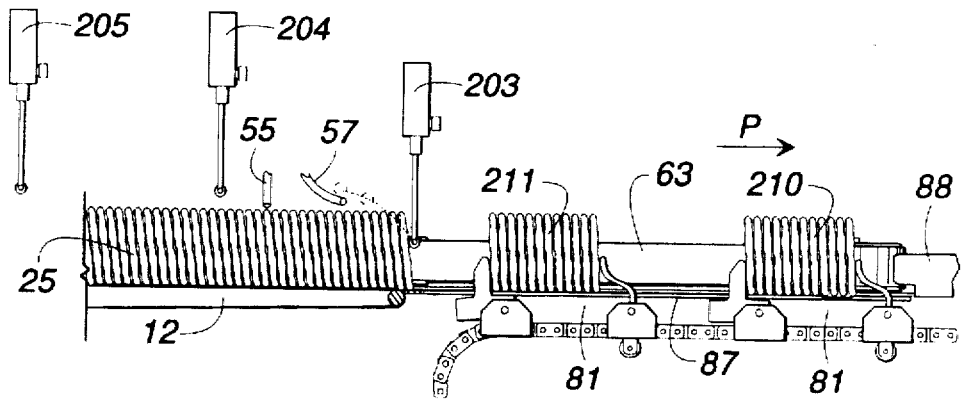

The method of operating apparatus 5 is also illustrated in FIGS. 8A–8G. Referring first to FIG. 8A, a vertical row of edge standing work products 25 is shown being accumulated on tape belt 12 upstream of a first separator knife 201 positioned at the home position 53 of the apparatus. Tape belt 12 is moving faster than side belt 63, and side belt 63 is moving faster than flights 81 (FIG. 1) of infeed conveyor 80. Tape belt 12 is continuously moving underneath the work product.

The speed of tape belt 12 is determined by the amount of surface friction present between the row of edge standing work products 25, and the surface of the tape belt. For example, if the work products are square crackers or the like, then tape belt 12 will be moved slower than it would if work products 25 were circular crackers in which a relatively smaller portion of the cracker would be riding on the surface of tape belt 12. Once, however, the speed ratio of tape belt 12 with respect to the friction of the work products 25 being carried thereon is established, the friction to speed ratio will remain constant despite increases or decreases in the speed of supply belt 12 to either increase or decrease the speed with which work product groups are formed, or for momentarily slowing supply belt 12 as shown in step 178 of FIG. 7B.

The position of knife 208 at home position 53 shown in FIG. 8A occurs during steps 146 to 172 of FIGS. 7A–B, in which the separator knife is held in the home position while accumulating a row of edge standing work products until the work products are detected by low speed sensor 23, thus signaling that a "prime" or row of vertical edge standing work product exists for being packaged.

Thereafter, and as shown in FIG. 8B, in accordance with step 172 of FIG. 7B, knife 201 is moved approximately 1 inch in the direction of the path of travel at a speed greater than the speed and direction of the row of work products along tape belt 12 and equal to the speed of side belt 63. Thereafter, and as shown in FIG. 8C, first separator knife 201 is moved upward by servomotor 49, driving knife assembly 36 along cam track 35, and cam profile 35', at a third speed greater than the speed of side belts 63, whereupon a generally continuous and uninterrupted row of edge standing work products 25 is being moved into and between side belts 63. Thereafter, and as shown in FIG. 8D, in accordance with steps 178–182 of FIG. 7B, air jets 55, 57 and 59 are activated for creating a gap in the row of work products and for holding the work products in an upright orientation as the now formed group departs the home position, while tape belt 12 is momentarily slowed by control processor 99 so that second knife 202 is inserted into the row of work products and stopped at the home position 53 to allow the now defined group 210 of work products to travel along the path of travel toward infeed conveyor 80.

Thereafter, as shown in FIGS. 8B–G, and steps 182 through 198 of the control program of FIGS. 7B and 7C, the program loops back to step 152 and executes steps 152 to 170 prior to once again executing steps 172 to 184 to form a second group of work products 211. This process is then repeated for each flight cycle for infeed conveyor 80 until such time as it is desired to stop packaging machine 7 and/or the completion of packaging operations.

So constructed, and operated, apparatus 5 presents a significant advance in the art of forming groups of work product with a flexibility heretofore unknown in the art. While a preferred embodiment of the invention has been disclosed in the foregoing specification, it is understood by those skilled in the art that variations and modifications thereof can be made without departing from the spirit and scope of the invention, as set forth in the following claims. Moreover, the corresponding structures, materials, acts, and equivalents of all means or step plus function elements in the claimed elements are intended to include any structure, material, or acts for performing the functions in combination with other claimed elements as specifically claimed.

I claim:

1. A method of forming a generally continuous row of edge standing and aligned work products being advanced along a path of travel on a feed conveyor into separate groups of work products supplied to an infeed conveyor of a packaging machine, the infeed conveyor having a spaced series of flights for receiving respective ones of the groups of work products therein, said method comprising the steps of a) inserting a separator knife into the row of work products in timed relationship with the movement of the row of work products along the path of travel at a speed and direction substantially the same as the speed and direction of the work products along the path of travel;

b) stopping the movement of said separator knife at a home position for accumulating at least a portion of the row of work products on the feed conveyor upstream of said home position;

c) forming a first group of work products downstream of said home position as the remainder of the row of work products continues to move downstream along the path of travel away from said separator knife and into one of the flights of the infeed conveyor, d) moving said separator knife and the accumulated work products from said home position in the direction of the path of travel in timed response to the movement of the flights of the infeed conveyor along the path of travel;

e) withdrawing said separator knife from in front of the row of work products and releasing the row of work products for movement along the path of travel toward the packaging machine;

f) inserting a spaced second separator knife into the row of work products in timed relationship with the movement of the row of work products along the path of travel at a speed and direction substantially the same as the speed and direction of the work products alone the path of travel.

g) stopping the movement of said second separator knife at said home position for accumulating at least a portion of the work products on the feed conveyor upstream of said home position, h) forming a second group of work products downstream of said home position as the remainder of the row of work products moves downstream along the path of travel away from said second separator blade and into one of the flights of the infeed conveyor; and i) momentarily slowing the movement of the feed conveyor as each of said separator knives is inserted into the row of work products for creating an opening within the row of work products for a respective one of said separator knives.

2. The method of claim 1, wherein the step of forming said groups of work products includes the step of varying the time of the insertion of a respective one of said separator knives into the row of work products with respect to the movement of the flights of the infeed conveyor for increasing and decreasing the sizes of said groups of work products so formed.

3. The method of claim 2, further comprising the step of automatically varying the time of the insertion of said separator knives into the row of work products in response to measuring the sizes of said groups of work products as said groups of work products move along the path of travel downstream of said home position.

4. The method of claim 1, comprising the step of phasing the movement of said separator knives from said home position in the direction of the path of travel with respect to the movement of the flights of the infeed conveyor for advancing and retarding the movement of said groups of work products into the flights of the infeed conveyor.

5. The method of claim 1, comprising the step of activating a first pair of air jets as each of said separator knives is inserted into the row of work products for creating an opening within the row of work products for said separator knives.

6. The method of claim 5, comprising the step of activating at least a second pair of air jets as each of said separator knives is inserted into the row of work products for holding the work products within said groups of work products in a generally upright edge standing orientation as said groups of work products are moved away from said home position and toward one of the flights of the infeed conveyor.

7. The method of claim 1, wherein the steps of moving said separator knife from said home position in the direction of the path of travel, withdrawing said separator knife from in front of the row of work products, and inserting said second separator knife into the row of work products in timed relationship with the movement of the row of work products re-occur for each flight of the infeed conveyor.

8. A method of forming a generally continuous row of edge standing and aligned work products being advanced along a path of travel on a feed conveyor into separate groups of work products supplied to an infeed conveyor of a packaging machine, the infeed conveyor having a spaced series of flights for receiving respective ones of the groups of work products therein, said method comprising the steps of:

a) moving a separator knife along the path of travel toward a home position;

b) detecting the presence of said separator knife at said home position with an electronic home position detector, and in response thereto emitting a stop signal to stop the movement of the separator knife at said home position;

c) accumulating the work products on the feed conveyor upstream of said home position;

d) moving said separator knife and the accumulated work products from said home position in the direction of the path of travel in timed response to the movement of the flights of the infeed conveyor along the path of travel;

e) withdrawing said separator knife from in front of the row of work products and releasing the row of work products for movement along the path of travel toward the packaging machine;

f) inserting a second separator knife into the row of work products in timed relationship with the movement of the row of work products along the path of travel at a speed and direction substantially the same as the speed and direction of the work products along the path of travel;

g) stopping the movement of said second separator knife at said home position and accumulating at least a portion of the row of work products on the feed conveyor upstream of said home position; and h) forming a group of work products as the remainder of the row of work products continues to move downstream along the path of travel away from said home position and into one of the flights of the infeed conveyor.

9. An apparatus for forming a generally continuous row of edge standing and aligned work products being carried on a feed conveyor along a path of travel into separate groups of work products supplied to an infeed conveyor of a packaging machine, the infeed conveyor having a spaced series of flights for receiving respective ones of the groups of work products therein, said apparatus comprising:

at least one separator knife constructed and arranged to be moved in the direction of the path of travel with respect to the feed conveyor;

cam means for inserting said at least one separator knife into the row of work products in timed relationship with the movement of the row of work products along the path of travel at a speed and direction substantially the same as the speed and direction of the row of work products along the path of travel; and a detector for emitting a detection signal in response to the detection of said at least one separator knife at a home position fixed along the path of travel;

said cam means being constructed and arranged to stop said at least one separator knife at said home position in response to the emission of said detection signal so that said at least one separator knife accumulates at least a portion of the row of work products on the feed conveyor at said home position as the remainder of the row of work products continues to move downstream along the path of travel for forming a spaced group of work products moving away from said home position and toward the infeed conveyor, said cam means being further constructed and arranged to move said at least one separator knife from said home position in the direction of the path of travel in timed response to the movement of the flights of the infeed conveyor, and to withdraw said at least one separator knife from in front of the row of work products for releasing the row of work products for movement along the path of travel toward the packaging machine.

10. The apparatus of claim 9, said cam means comprising a mechanical cam means and an electronic cam means.

11. The apparatus of claim 10, said mechanical cam means comprising:

a cam track positioned with respect to the row of work products moved along the path of travel on the feed conveyor, a chain conveyor for moving said at least one separator knife along said cam track, said at least one separator knife being operably fastened to said chain conveyor; and drive means for moving said chain conveyor along said cam track;

said at least one separator knife having a cam follower, said cam follower being constructed and arranged to be received within said cam track for guiding said at least one separator knife along said cam track;

said cam track having a physical cam profile constructed and arranged to guide said at least one separator knife toward the row of work products as said at least one separator knife is moved along the path of travel.

12. The apparatus of claim 11, said drive means for moving said chain conveyor comprising a servomotor, said servomotor including an encoder adapted to emit a servomotor drive position signal of the drive position of said servomotor.

13. The apparatus of claim 12, further comprising:

a signal generating means for emitting a flight position signal;

said electronic cam means comprising a control processor constructed and arranged to calculate an electronic cam profile;

said control processor being constructed and arranged to receive said detection signal emitted by said detector, said servomotor drive position signal, and said flight position signal to compare and process said signals against said electronic cam profile;

said control processor being constructed and arranged to then emit a dwell control signal to said servomotor in response thereto to dwell the operation of said servomotor and stop the movement of said at least one separator knife along the path of travel for a programmed dwell period for forming, and for increasing and decreasing the size of, the groups of work products moving away from said home position.

14. The apparatus of claim 13, further comprising a first pair of air jets positioned on opposite sides of the path of travel and being constructed and arranged to emit a first jet of compressed air directed toward the row of work products for creating an opening between the work products in response to an air jet control signal, said control processor being adapted to emit said air jet control signal to said first pair of air jets in timed relationship with the insertion of said at least one separator knife into the row of work products.

15. The apparatus of claim 14, further comprising an alignment means positioned adjacent the path of travel and upstream of said home position for aligning the row of edge standing work products along the path of travel in response to the emission of said air jet control signal by said control processor.

16. The apparatus of claim 13, further comprising a second and a third pair of air jets positioned on adjacent sides of the path of travel and being spaced with respect to each other, said second pair and said third pair of air jets being constructed and arranged to emit a second and a third jet of compressed air, respectively, directed toward said groups of work products in response to said air jet control signal as said groups of work products move along the path of travel away from said home position for holding the work products in said groups of work products in a generally upright edge standing orientation.

17. The apparatus of claim 13, said control processor being adapted to emit a feed conveyor speed control signal to the feed conveyor for momentarily slowing the speed of the feed conveyor in timed relationship with the insertion of said at least one separator knife into the row of work products.

18. The apparatus of claim 13, further comprising an advance/retard switch, said advance/retard switch being adapted to emit a phase adjustment signal to said control processor, wherein said control processor emits a phase control signal in response thereto to the servomotor of said mechanical cam means for phasing the movement of said at least one separator blade in the direction in the path of travel with respect to the movement of the flights of the feed conveyor.

19. The apparatus of claim 13, further comprising a checkweight sensor positioned adjacent the path of travel and downstream of said home position for measuring the size of said groups of work products, said checkweight sensor being adapted to emit a checkweight signal to said control processor, wherein said control processor is adapted to increase and decrease said dwell control signal in response thereto for decreasing and increasing, respectively, the size of said groups of work products.

20. The apparatus of claim 13, said apparatus including a low speed prime sensor for detecting the presence of the row of edge standing work products at a first predetermined position on the feed conveyor upstream of said home position, said low speed prime sensor being adapted to emit a low speed prime signal to said control processor in response thereto, wherein said control processor is adapted to emit a first run control signal to the packaging machine in response thereto for starting the movement of the infeed conveyor along the path of travel.

21. The apparatus of claim 20, said apparatus including a high speed prime sensor for detecting the presence of the row of edge standing work products at a second predetermined position on the feed conveyor upstream of said low speed prime sensor, said high speed prime sensor being adapted to emit a high speed prime signal to said control processor in response thereto, wherein said control processor is adapted to emit a second run control signal to the packaging machine in response thereto for increasing the speed of the packaging machine and the speed of the infeed conveyor along the path of travel.

22. An apparatus for forming a generally continuous row of edge standing and aligned work products into separate groups of work products supplied to a packaging machine, said apparatus comprising:

a framework;

a continuously moving feed conveyor supported on said framework and extending along a path of travel toward the packaging machine;

an infeed conveyor on said framework downstream of said feed conveyor and extending along the path of travel, said infeed conveyor having a continuously moving and spaced series of flights for carrying respective ones of the groups of work products therein;

cam means for inserting a first separator knife into the row of work products in timed relationship with the movement of the row of work products on said feed conveyor at a speed and direction substantially the same as the speed and direction of the row of work products on said feed conveyor;

said cam means being constructed and arranged to stop said first separator knife at a home position along the path of travel for accumulating the row of work products on said feed conveyor behind said first separator knife upstream of said home position, to move said first separator knife from said home position in the direction of the path of travel in timed response to the movement of the flights of the infeed conveyor along the path of travel, and to withdraw said first separator knife from in front of the row of work products for releasing the row of work products for movement along the path of travel toward the packaging machine; and a detector for emitting a detection signal in response to the arrival of said first separator knife at said home position;

whereby said cam means stops said first separator knife at said home position in response to the emission of said detection signal for accumulating at least a portion of the row of work products at said home position upstream of said first separator knife as the remainder of the row of work products continues to move downstream along the path of travel to form a group of work products, said group of work products moving downstream along the path of travel and away from said home position and into one of the flights of the infeed conveyor.

23. The apparatus of claim 22, further comprising a second separator knife spaced from said first separator knife, wherein said cam means is constructed and arranged to insert said second separator knife into the row of work products in timed relationship with the movement of said first separator knife and the row of work products along the path of travel at a speed and direction substantially the same as the speed and direction of the row of work products along the path of travel.

24. The apparatus of claim 22, further comprising a side belt conveyor assembly supported on said framework intermediate said feed conveyor and said infeed conveyor, said side belt assembly having a pair of endless conveyor belts spaced equally apart from one another on opposite sides of the path of travel for receiving the work products therebetween.

25. The apparatus of claim 24, wherein said pair of side belts diverge from one another in the downstream direction of the path of travel.

26. A method of forming a generally continuous row of edge standing and aligned work products being advanced along a path of travel on a feed conveyor into separate groups of work products supplied to an infeed conveyor of a packaging machine, the infeed conveyor having a spaced series of flights for receiving respective ones of the groups of work products therein, said method comprising the steps of a) inserting a separator knife into the row of work products in timed relationship with the movement of the row of work products along the path of travel at a speed and direction substantially the same as the speed and direction of the work products along the path of travel;

b) stopping the movement of said separator knife at a home position and accumulating at least a portion of the row of work products on the feed conveyor upstream of said separator knife;

c) in response thereto, forming a first group of work products downstream of said separator knife as the remainder of the row of work products continues to move downstream along the path of travel toward the infeed conveyor;

d) moving said separator knife and the accumulated work products from said home position in the direction of the path of travel in timed response to the movement of the flights of the infeed conveyor along the path of travel;

e) withdrawing said separator knife from in front of the row of work products and releasing the row of work products for movement along the path of travel toward the packaging machine;

f) inserting a second separator knife, spaced along the path of travel from said separator knife, into the row of work products in timed relationship with the movement of the row of work products along the path of travel at a speed and direction substantially the same as the speed and direction of the work products along the path of travel;

g) stopping the movement of said second separator knife at said home position and accumulating at least a portion of the work products on the feed conveyor upstream of said second separator knife;

h) in response thereto, forming a second group of work products downstream of said second separator knife as the remainder of the row of work products moves downstream along the path of travel toward the infeed conveyor;

i) activating a first pair of air jets as each respective one of said separator knives is inserted into the row of work products to create an opening within the row of work products for the respective ones of said separator knives; and j) activating at least a second pair of air jets as each of said separator knives is inserted into the row of work products to hold the work products within said groups of work products in a generally upright edge standing orientation as said groups of work products are moved away from said home position and toward one of the flights of the infeed conveyor.

27. A method of forming a generally continuous row of edge standing and aligned work products being advanced along a path of travel on a feed conveyor into separate groups of work products supplied to an infeed conveyor of a packaging machine, the infeed conveyor having a spaced series of flights for receiving respective ones of the groups of work products therein, said method comprising the steps of:

a) inserting a separator knife into the row of work products in timed relationship with the movement of the row of work products along the path of travel at a speed and direction substantially the same as the speed and direction of the work products along the path of travel;

b) detecting the presence of said separator knife at a home position along the path of travel with a home position detector;

c) in response thereto, emitting a stop signal to stop the movement of said separator knife at said home position and to accumulate at least a portion of the row of work products on the feed conveyor upstream of said separator knife; and d) forming a first group of work products downstream of said separator knife as the remainder of the row of work products continues to move downstream along the path of travel away from said separator knife toward the infeed conveyor.

* * * * *